US011693929B2

(12) United States Patent
Hiratsuka

(10) Patent No.: US 11,693,929 B2
(45) Date of Patent: Jul. 4, 2023

(54) ELECTRONIC DEVICE, INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventor: Yosuke Hiratsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 308 days.

(21) Appl. No.: 16/967,239

(22) PCT Filed: Jan. 30, 2019

(86) PCT No.: PCT/JP2019/003055
§ 371 (c)(1),
(2) Date: Aug. 4, 2020

(87) PCT Pub. No.: WO2019/159689
PCT Pub. Date: Aug. 22, 2019

(65) Prior Publication Data
US 2020/0394284 A1   Dec. 17, 2020

(30) Foreign Application Priority Data

Feb. 13, 2018   (JP) ................................. 2018-022804

(51) Int. Cl.
*H04L 9/32* (2006.01)
*G06F 21/10* (2013.01)

(52) U.S. Cl.
CPC .......... *G06F 21/105* (2013.01); *H04L 9/3242* (2013.01); *G06F 2221/0757* (2013.01)

(58) Field of Classification Search
CPC ........... G06F 21/105; G06F 2221/0757; G06F 2221/0777; G06F 21/10; H04L 9/3242; H04L 9/0861; H04L 9/0894; H04L 9/3239
See application file for complete search history.

(56) References Cited

U.S. PATENT DOCUMENTS 7,010,808 B1 * 3/2006 Leung ................ H04N 21/4627
713/193
9,846,899 B1 * 12/2017 Stickle .................... G06F 21/10
(Continued)

FOREIGN PATENT DOCUMENTS

EP   3115917 A1   1/2017
JP   2005-165631 A   6/2005
(Continued)

OTHER PUBLICATIONS

International Search Report and Written Opinion of PCT Application No. PCT/JP2019/003055, dated Apr. 9, 2019 13 pages of ISRWO.

*Primary Examiner* — David Garcia Cervetti
(74) *Attorney, Agent, or Firm* — Chip Law Group

(57) ABSTRACT

Provided is an electronic device, an information processing apparatus, an information processing method, and an information processing system capable of improving convenience in a case where a floating license is used in an electronic device that does not directly communicate with an information processing apparatus providing the floating license. The information processing apparatus includes a storage control unit that controls a storage unit to store a combination of a device unique key and an installation key, the device unique key being a key unique to an electronic device, and the installation key being a key for installing a license to the electronic device; and a license management unit that updates information regarding a status of the license in a case where a combination of the device unique key corresponding to license return information and the installation key corresponding to installation key information in the license return information coincides with a combination stored in the storage unit, the license return information being information including the installation key (Continued)

information corresponding to the installation key and generated by the electronic device.

21 Claims, 18 Drawing Sheets

(56) References Cited

U.S. PATENT DOCUMENTS

| | | | | |
|---|---|---|---|---|
| 11,068,136 B1* | 7/2021 | Koushik | ............... | G06F 3/0482 |
| 2004/0148525 A1* | 7/2004 | Aida | ............... | G06F 8/61 |
| | | | | 726/28 |
| 2005/0289072 A1* | 12/2005 | Sabharwal | ............ | G06F 21/121 |
| | | | | 705/59 |
| 2006/0059101 A1* | 3/2006 | Ebihara | ................. | G06F 21/10 |
| | | | | 705/59 |
| 2006/0059102 A1* | 3/2006 | Ebihara | ................. | G06F 21/10 |
| | | | | 705/59 |
| 2006/0059103 A1* | 3/2006 | Ebihara | ................. | G06F 21/10 |
| | | | | 705/59 |
| 2006/0059105 A1* | 3/2006 | Ebihara | ................. | G06F 21/10 |
| | | | | 705/59 |
| 2006/0179002 A1* | 8/2006 | Brooks | ................. | G06F 21/10 |
| | | | | 705/59 |
| 2006/0282511 A1* | 12/2006 | Takano | ................. | H04L 63/08 |
| | | | | 709/217 |
| 2007/0174147 A1* | 7/2007 | Klein | ................. | H04N 21/8113 |
| | | | | 705/28 |
| 2007/0198431 A1* | 8/2007 | Choi | ................. | H04L 9/3213 |
| | | | | 705/59 |
| 2008/0005033 A1* | 1/2008 | Clark | ................. | G06F 21/121 |
| | | | | 705/59 |
| 2008/0244754 A1* | 10/2008 | Curren | ................. | G06F 21/105 |
| | | | | 726/27 |
| 2009/0151000 A1* | 6/2009 | Okamoto | ............... | H04L 9/0833 |
| | | | | 380/279 |
| 2009/0290716 A1* | 11/2009 | O'Connor | ............ | H04L 63/126 |
| | | | | 380/278 |
| 2011/0041125 A1* | 2/2011 | Sugiura | ................. | G06F 21/10 |
| | | | | 717/176 |
| 2011/0276501 A1* | 11/2011 | Sako | ................. | G06F 21/10 |
| | | | | 705/310 |
| 2011/0296175 A1* | 12/2011 | Shin | ................. | H04L 9/0891 |
| | | | | 380/278 |
| 2012/0042168 A1* | 2/2012 | Yuan | ................. | H04L 9/3247 |
| | | | | 713/176 |
| 2012/0110342 A1* | 5/2012 | Agrawal | ............. | H04L 63/0478 |
| | | | | 713/189 |
| 2012/0150812 A1* | 6/2012 | Burns | ................. | H04L 9/0825 |
| | | | | 707/661 |
| 2012/0233706 A1* | 9/2012 | O'Connor | ............. | G06F 21/123 |
| | | | | 726/30 |
| 2012/0317418 A1* | 12/2012 | Brundridge | ............. | G06F 21/10 |
| | | | | 713/176 |
| 2015/0026330 A1 | 1/2015 | Ahmed | | |
| 2015/0096059 A1* | 4/2015 | Naik | ................. | G06F 21/121 |
| | | | | 726/30 |
| 2015/0121540 A1* | 4/2015 | Citron | ................. | G06Q 50/184 |
| | | | | 726/27 |
| 2015/0319148 A1* | 11/2015 | Lemelev | ............. | G06F 21/128 |
| | | | | 726/30 |
| 2016/0162668 A1* | 6/2016 | Yamazaki | ............. | G06F 21/105 |
| | | | | 726/28 |
| 2016/0232334 A1* | 8/2016 | Kosovan | ............. | G06F 21/105 |
| 2016/0292398 A1* | 10/2016 | Makam | ............. | G06F 21/105 |
| 2017/0076097 A1* | 3/2017 | Ali | ........ | G06F 21/602 |
| 2017/0109506 A1* | 4/2017 | Shetty | ................. | G06F 16/13 |
| 2017/0111289 A1* | 4/2017 | Cropper | ............. | H04M 15/80 |
| 2017/0161662 A1* | 6/2017 | Wang | ................. | G06Q 10/06315 |
| 2017/0186117 A1* | 6/2017 | Ooki | ................. | G06Q 50/184 |
| 2018/0007127 A1* | 1/2018 | Salapura | ............. | H04L 47/783 |
| 2018/0053271 A1* | 2/2018 | Mahindru | ............ | G06Q 50/184 |
| 2018/0373847 A1* | 12/2018 | Lo | ................. | H04N 21/4627 |
| 2020/0026825 A1* | 1/2020 | Povey | ................. | G06F 21/34 |

FOREIGN PATENT DOCUMENTS

| | | |
|---|---|---|
| JP | 2006-277088 A | 10/2006 |
| JP | 2013-109544 A | 6/2013 |
| JP | 2013-131015 A | 7/2013 |
| JP | 2017-134773 A | 8/2017 |
| WO | 2010/032391 A1 | 3/2010 |
| WO | 2010032391 A1 | 3/2010 |

* cited by examiner

DEVICE INFORMATION FILE
HAS BEEN WRITTEN OUT

PLEASE UPLOAD DEVICE
INFORMATION FILE
ACQUIRED FROM CAMERA

UPLOAD

CAMERA:XXX-XXX-XXXXXX
DO YOU WANT TO INSTALL
LICENSE IN THIS DEVICE?

INSTALL

PLEASE DOWNLOAD LICENSE
COMMUNICATION FILE, STORE LICENSE
COMMUNICATION FILE IN MEDIUM,
AND INSERT MEDIUM INTO CAMERA

DOWNLOAD

352

ELECTRONIC DEVICE, INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2019/003055 filed on Jan. 30, 2019, which claims priority benefit of Japanese Patent Application No. JP 2018-022804 filed in the Japan Patent Office on Feb. 13, 2018. Each of the above-referenced applications is hereby incorporated herein by reference in its entirety.

TECHNICAL FIELD

The present technology relates to an electronic device, an information processing apparatus, an information processing method, a program, and an information processing system, and more particularly, to an electronic device, an information processing apparatus, an information processing method, a program, and an information processing system that are suitable for being used in a case where a license provided by the information processing apparatus is used in the electronic device that does not directly communicate with the information processing apparatus.

BACKGROUND ART

Conventionally, a floating license has been used as one of manners of providing a license of a function used in an electronic device from a server (see, for example, Patent Document 1). By using the floating license, the function can be used by electronic devices of which the number exceeds the number of licenses.

CITATION LIST

Patent Document

Patent Document 1: Japanese Patent Application Laid-Open No. 2017-134773

SUMMARY OF THE INVENTION

Problems to be Solved by the Invention

By the way, there is a need to enable a floating license provided by a server to be used even in an electronic device that does not directly communicate with the server.

The present technology has been made in view of such a situation, and is to improve convenience in a case where a floating license is used in an electronic device that does not directly communicate with an information processing apparatus such as a server or the like providing the floating license.

Solutions to Problems

An information processing apparatus according to a first aspect of the present technology includes: a storage control unit that controls a storage unit to store a combination of a device unique key and an installation key, the device unique key being a key unique to an electronic device, and the installation key being a key for installing a license to the electronic device; and a license management unit that updates information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

An information processing method according to a first aspect of the present technology includes: controlling, by an information processing apparatus, a storage unit to store a combination of a device unique key and an installation key, the device unique key being a key unique to an electronic device, and the installation key being a key for installing a license to the electronic device; and updating, by the information processing apparatus, information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

A program according to a first aspect of the present technology causes a computer to execute processing for: controlling a storage unit to store a combination of a device unique key and an installation key, the device unique key being a key unique to an electronic device, and the installation key being a key for installing a license to the electronic device; and updating information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

An electronic device according to a second aspect of the present technology includes: a key generation unit that generates a device unique key that is a key unique to every device; and a data generation unit that generates license return information, the license return information being information which includes installation key information corresponding to an installation key supplied from a first information processing apparatus in order to install a license and whose security is secured using the device unique key and being information which is used for returning the license to the first information processing apparatus.

An information processing method according to a second aspect of the present technology includes: generating, by an electronic device, a device unique key that is a key unique to the electronic device; and generating, by the electronic device, license return information, the license return information being information which includes installation key information corresponding to an installation key supplied from an information processing apparatus in order to install a license and whose security is secured using the device unique key and being information which is used for returning the license to the information processing apparatus.

A program according to a second aspect of the present technology causes a computer of an electronic device to execute processing for: generating a device unique key that is a key unique to the electronic device; and generating license return information, the license return information being information which includes installation key information corresponding to an installation key supplied from an information processing apparatus in order to install a license and whose security is secured using the device unique key and being information which is used for returning the license to the information processing apparatus.

An information processing system according to a third aspect of the present technology includes: an electronic device; a first information processing apparatus; and a second information processing apparatus, in which the electronic device generates a device unique key that is a key unique to the electronic device, and generates license return information, the license return information being information which includes installation key information corresponding to an installation key supplied from the second information processing apparatus in order to install a license and whose security is secured using the device unique key, the first information processing apparatus transmits the license return information to the second information processing apparatus, and the second information processing apparatus updates information regarding a status of the license in a case where a combination of the device unique key corresponding to the license return information and the installation key corresponding to the installation key information in the license return information coincides with a combination stored in a storage unit.

In the first aspect of the present technology, the storage unit is controlled to store the combination of the device unique key and the installation key, the device unique key being the key unique to the electronic device, and the installation key being the key for installing the license to the electronic device, and the information regarding the status of the license is updated in a case where the combination of the device unique key corresponding to license return information and the installation key corresponding to the installation key information in the license return information coincides with the combination stored in the storage unit, the license return information being the information including the installation key information corresponding to the installation key and generated by the electronic device.

In the second aspect of the present technology, the device unique key that is the key unique to the electronic device is generated, and the license return information is generated, the license return information being the information which includes the installation key information corresponding to the installation key supplied from the information processing apparatus in order to install the license and whose security is secured using the device unique key and being the information which is used for returning the license to the information processing apparatus.

In the third aspect of the present technology, the device unique key that is the key unique to the electronic device and the license return information are generated by the electronic device, the license return information being the information which includes the installation key information corresponding to the installation key supplied from the second information processing apparatus in order to install the license and whose security is secured using the device unique key; the license return information is transmitted to the second information processing apparatus by the first information processing apparatus; and the information regarding the status of the license is updated by the second information processing apparatus in a case where the combination of the device unique key corresponding to the license return information and the installation key corresponding to the installation key information in the license return information coincides with the combination stored in the storage unit.

Effects of the Invention

According to the first to third aspects of the present technology, a floating license can be used in the electronic device that does not directly communicate with the information processing apparatus providing the floating license. Furthermore, according to the first to third aspects of the present technology, it is possible to improve convenience in a case where the floating license is used in the electronic device that does not directly communicate with the information processing apparatus providing the floating license.

Note that an effect described here is not necessarily limited, and may be any effect described in the present disclosure.

BRIEF DESCRIPTION OF DRAWINGS

FIG. 9 is a diagram illustrating an example of a screen of an electronic device.

FIG. 10 is a diagram illustrating an example of a screen of the PC.

FIG. 11 is a diagram illustrating an example of a screen of the PC.

FIG. 12 is a diagram illustrating an example of a screen of the PC.

MODE FOR CARRYING OUT THE INVENTION

Hereinafter, an embodiment for carrying out the present technology will be described. A description will be given in the following order.

1. Embodiment
2. Modification
3. Others

1. Embodiment

First, an embodiment of the present technology will be described with reference to FIGS. 1 to 24.

<Configuration Example of Information Processing System 10>

Figure 1:
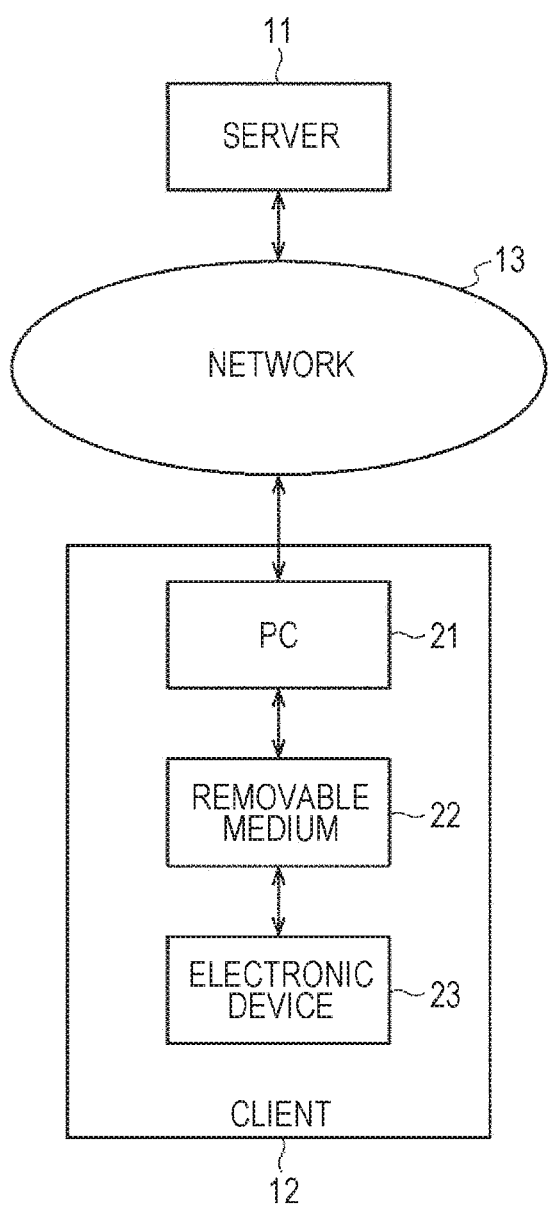
FIG. 1 is a block diagram illustrating an embodiment of an information processing system to which the present technology is applied.

FIG. 1 illustrates a configuration example of an information processing system 10 to which the present technology is applied.

The information processing system 10 includes a server 11, a client 12, and a network 13. The client 12 includes a personal computer (PC) 21, a removable medium 22, and an electronic device 23.

The server 11 and the PC 21 are connected to each other and communicate with each other, via the network 13.

The server 11 performs provision and management of a license (floating license) of a function used in the electronic device 23, provision of software for realizing the function of the electronic device 23, and the like.

The PC 21 exchanges various data with the server 11 by communicating with the server 11 via the network 13. For example, the PC 21 receives data regarding the license of the function used in the electronic device 23 and various data such as software and the like used in the electronic device 23, from the server 11. Furthermore, the PC 21 transmits various data such as data and the like regarding the electronic device 23 to the server 11.

The removable medium 22 includes a magnetic disk, an optical disk, a magneto-optical disk, a semiconductor memory, or the like, and is used to exchange various data between the PC 21 and the electronic device 23.

Note that the removable medium 22 will hereinafter be simply referred to as a medium 22.

The electronic device 23 is difficult to connect to the network 13, basically does not directly communicate with the server 11, and is used offline. Furthermore, the electronic device 23 can use a function corresponding to the installed license by installing the license provided from the server 11 via the medium 22. Moreover, the electronic device 23 returns the license provided from the server 11 to the server 11 via the medium 22 and the PC 21, if necessary.

Note that a type of the electronic device 23 is not particularly limited. Hereinafter, a case where the electronic device 23 is a camera will be mainly described by way of example.

Furthermore, a type of a function that becomes a target of the license provided by the server 11 is not particularly limited. For example, the function may not be necessarily a function using software, and may be a function realized only by hardware.

Moreover, the server 11 may also provide software for realizing the function that becomes the target of the license. In this case, the license of the function is also a license of the software for realizing the function.

Furthermore, only one client 12 has been illustrated in FIG. 1 for making it easy to understand the drawing and the description, but a plurality of clients 12 is actually provided. Moreover, only one server 11 has also been illustrated, but a plurality of servers 11 may be provided. Furthermore, the number of at least one of the PC 21, the medium 22, or the electronic device 23 included in one client 12 may be plural.

<Configuration Example of Server 11>

Figure 2:
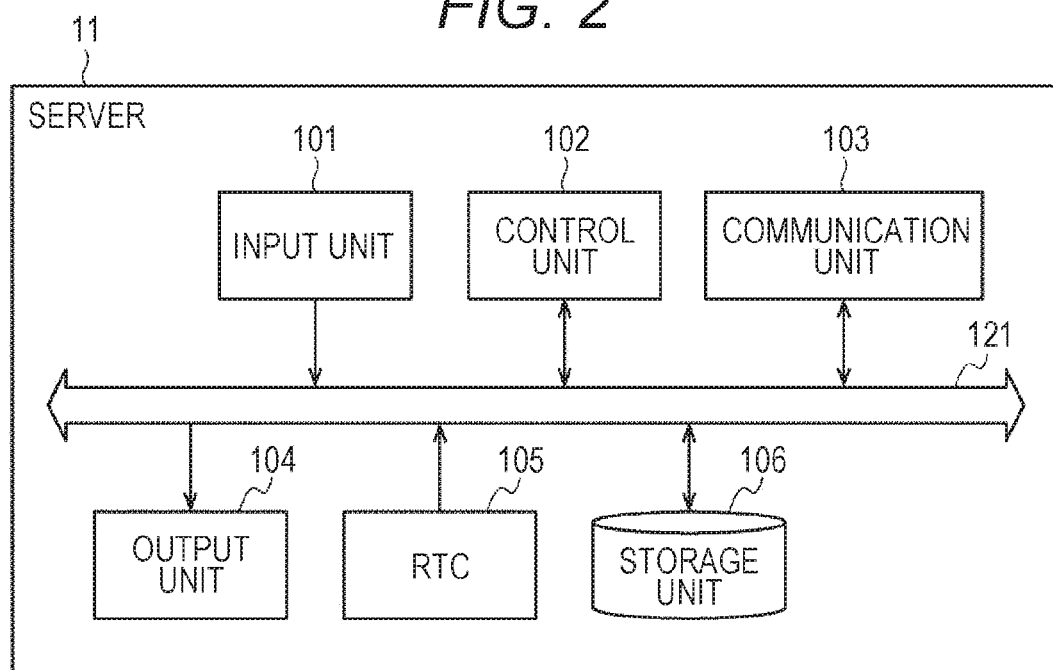
FIG. 2 is a block diagram illustrating a configuration example of a server.

FIG. 2 illustrates a configuration example of the server 11.

The server 11 includes an input unit 101, a control unit 102, a communication unit 103, an output unit 104, a real time clock (RTC) 105, and a storage unit 106. The input unit 101, the control unit 102, the communication unit 103, the output unit 104, the RTC 105, and the storage unit 106 are connected to each other via a bus 121.

The input unit 101 includes, for example, input devices such as a switch, a button, a key, a microphone, an imaging element, and the like, and is used to input various data. The input unit 101 supplies the input data to each unit of the server 11 via the bus 121.

The control unit 102 includes, for example, a processor such as a central processing unit (CPU) and the like, and controls processing of each unit of the server 11.

The communication unit 103 includes, for example, a communication device and the like, and communicates with the PC 21 via the network 13. Note that a communication manner of the communication unit 103 is not particularly limited, and may be any one of a wired communication manner or a wireless communication manner. Furthermore, for example, the communication unit 103 may correspond to a plurality of communication manners.

The output unit 104 includes, for example, output devices such as a display, a speaker, a lighting device, a vibrator, and the like, and outputs various data by an image, a sound, light, vibrations, and the like.

The RTC 105 is a hardware clock that continues to operate by a backup battery (not illustrated) and the like even though a power supply of the server 11 is turned off. The RTC 105 is managed so that a user cannot change the date and time (a date and a time).

The storage unit 106 includes at least a non-volatile storage medium, and stores various data or software necessary for processing of the server 11.

Note that, hereinafter, in a case where the respective units of the server 11 exchange data and the like with each other via the bus 121, a description of the bus 121 will be appropriately omitted. For example, in a case where the control unit 102 and the communication unit 103 exchange data with each other via the bus 121, it is simply said that the control unit 102 and the communication unit 103 exchange data with each other.

<Configuration Example of Function of Control Unit 102>

Figure 3:
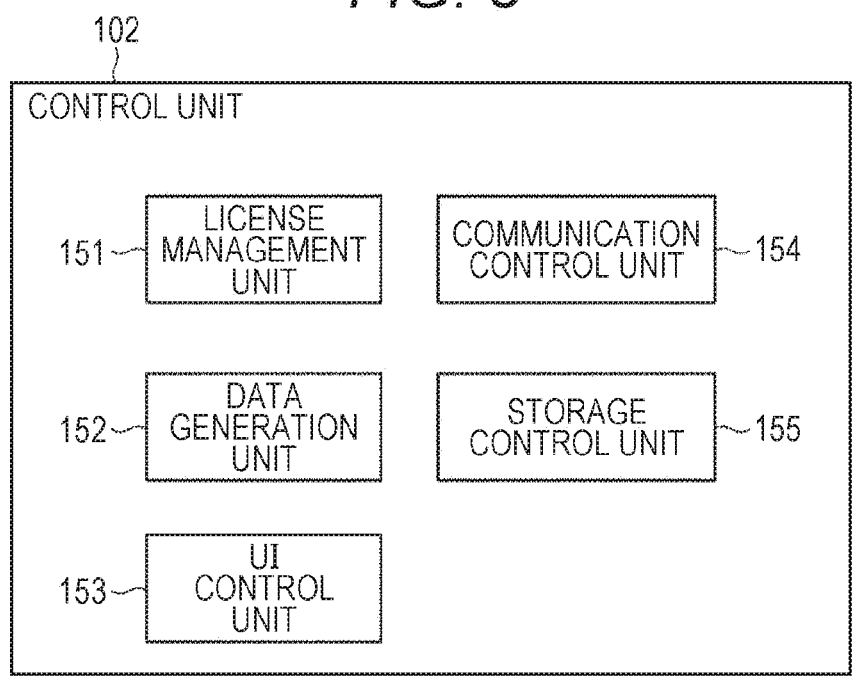
FIG. 3 is a block diagram illustrating a configuration example of a function of a control unit of the server.

FIG. 3 illustrates a configuration example of a function of the control unit 102 of the server 11. The control unit 102 realizes a function including a license management unit 151, a data generation unit 152, a user interface (UI) control unit 153, a communication control unit 154, and a storage control unit 155 by executing, for example, a control program.

The license management unit 151 manages a license of a function used in the electronic device 23.

The data generation unit 152 generates various data to be transmitted to the PC 21.

The UI control unit 153 controls user interfaces in the PC 21 and the electronic device 23. For example, the UI control unit 153 controls a user interface in the PC 21 by generating a display control file for displaying various information on a screen of the PC 21 and transmitting the display control file to the PC 21.

The communication control unit 154 controls communication processing by the communication unit 103. Furthermore, the communication control unit 154 also acquires data to be transmitted to the PC 21 from each unit of the server 11 or supplies data received from the PC 21 to each unit of the server 11.

The storage control unit 155 controls the storage unit 106 to store data and the like regarding the license of the function used in the electronic device 23.

<Configuration Example of Electronic Device 23>

Figure 4:
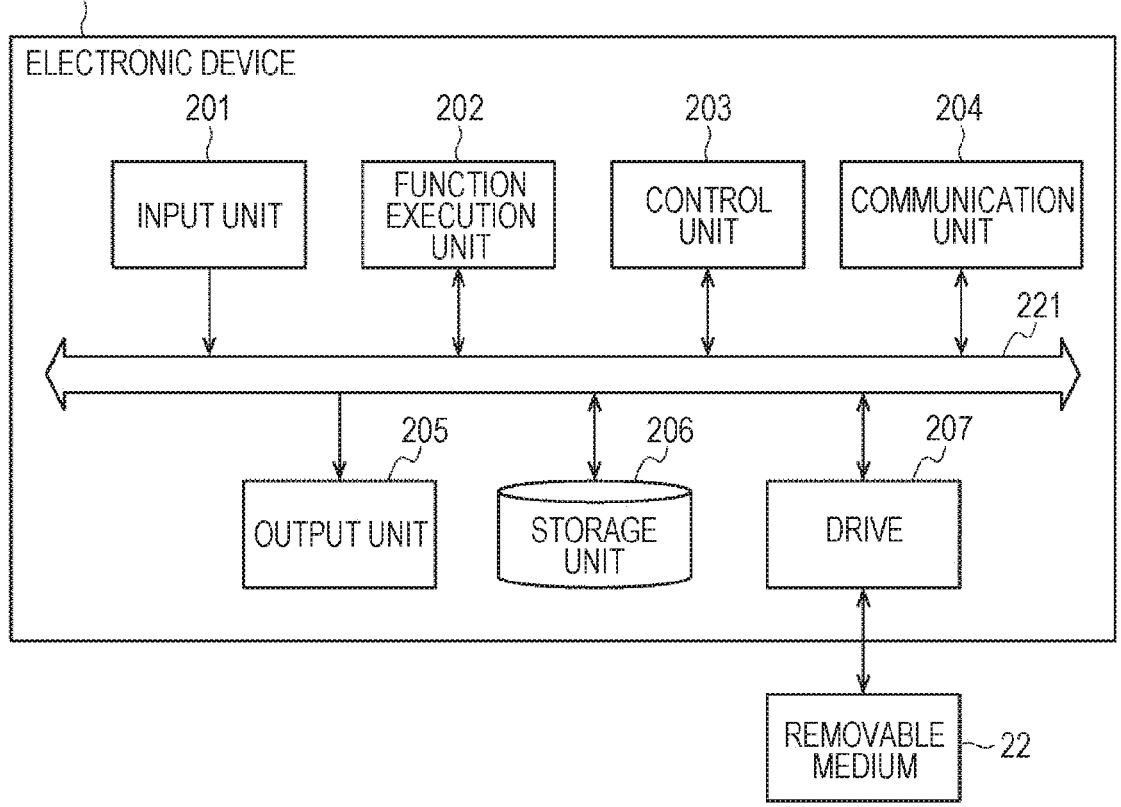
FIG. 4 is a block diagram illustrating a configuration example of an electronic device.

FIG. 4 illustrates a configuration example of the electronic device 23.

The electronic device 23 includes an input unit 201, a function execution unit 202, a control unit 203, a communication unit 204, an output unit 205, a storage unit 206, and a drive 207. The input unit 201, the function execution unit 202, the control unit 203, the communication unit 204, the output unit 205, the storage unit 206, and the drive 207 are connected to each other via a bus 221.

The input unit 201 includes, for example, input devices such as a switch, a button, a key, a microphone, an imaging element, and the like, and is used to input various data. The input unit 201 supplies the input data to each unit of the electronic device 23 via the bus 221.

The function execution unit 202 includes various hardware and software for executing the function of the electronic device 23. For example, in a case where the electronic device 23 is a camera, the function execution unit 202 includes a lens, an imaging element, and the like.

The control unit 203 includes, for example, a processor such as a CPU and the like, and controls processing of each unit of the electronic device 23.

The communication unit 204 includes, for example, a communication device and the like, and communicates with another electronic device (not illustrated) (for example, a smartphone or the like). Note that a communication manner of the communication unit 204 is not particularly limited, and may be any one of a wired communication manner or a wireless communication manner. Furthermore, for example, the communication unit 204 may correspond to a plurality of communication manners.

The output unit 205 includes, for example, output devices such as a display, a speaker, a lighting device, a vibrator, and the like, and outputs various data by an image, a sound, light, vibrations, and the like.

The storage unit 206 includes at least a non-volatile storage medium, and stores various data or software necessary for processing of the electronic device 23.

The drive 207 can attach and detach the medium 22, and drives the connected medium 22.

Note that, hereinafter, in a case where the respective units of the electronic device 23 exchange data and the like with each other via the bus 221, a description of the bus 221 will be appropriately omitted. For example, in a case where the control unit 203 and the communication unit 204 exchange data with each other via the bus 221, it is simply said that the control unit 203 and the communication unit 204 exchange data with each other.

<Configuration Example of Function of Control Unit 203>

Figure 5:
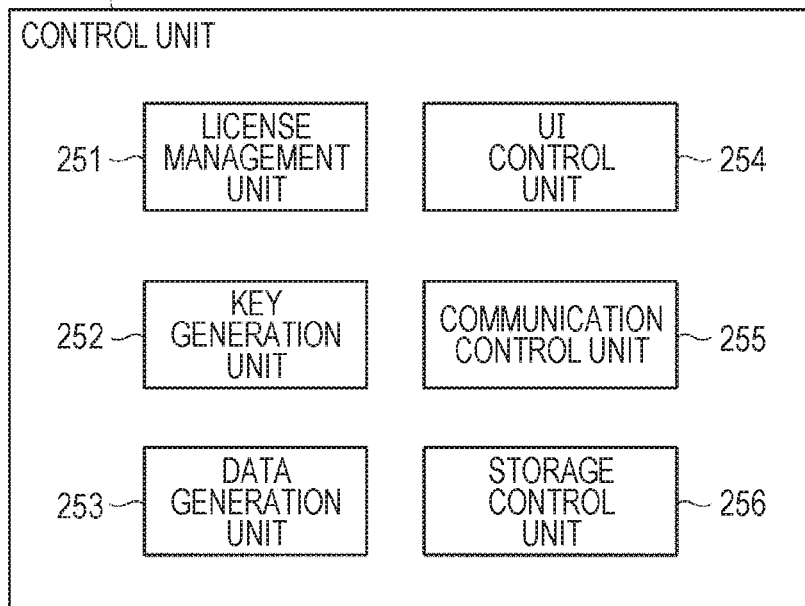
FIG. 5 is a block diagram illustrating a configuration example of a function of a control unit of the electronic device.

FIG. 5 illustrates a configuration example of a function of the control unit 203 of the electronic device 23. The control unit 203 realizes a function including a license management unit 251, a key generation unit 252, a data generation unit 253, a UI control unit 254, a communication control unit 255, and a storage control unit 256 by executing, for example, a control program.

The license management unit 251 manages the license of the function used in the electronic device 23.

The key generation unit 252 generates a device unique key, which is a unique secret key different for every electronic device 23.

The data generation unit 253 generates various data to be transmitted to the server 11 via the medium 22 and the PC 21.

The UI control unit 254 controls the output unit 205 to control a user interface in the electronic device 23.

The communication control unit 255 controls communication processing by the communication unit 204. Furthermore, the communication control unit 255 acquires data to be transmitted to the outside via the communication unit 204 from each unit of the electronic device 23 or supplies data received from the outside via the communication unit 204 to each unit of the electronic device 23.

The storage control unit 256 controls the storage unit 206 to store data and the like regarding the license of the function used in the electronic device 23.

<Processing of Information Processing System 10>

Next, processing of the information processing system 10 will be described with reference to FIGS. 6 to 24.

<License Acquisition Processing>

First, license acquisition processing executed by the client 12 will be described with reference to a flowchart of FIG. 6.

In step S1, the PC 21 requests a device information acquisition file.

Figure 7:
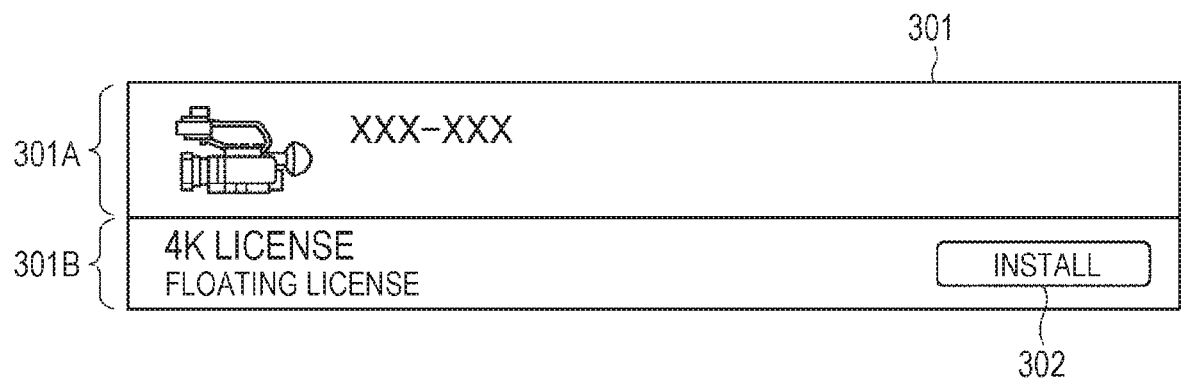
FIG. 7 is a diagram illustrating an example of a screen of a personal computer (PC).

For example, the PC 21 accesses the server 11 via the network 13 according to an operation of the user to display a screen for acquiring the license of the function used in the electronic device 23. For example, a window 301 of FIG. 7 is displayed on the screen of the PC 21.

The window 301 is divided into a device information field 301A and a license information field 301B.

At a left end of the device information field 301A, an image and a type name of the electronic device 23 are displayed laterally side by side.

At a left end of the license information field 301B, a function that becomes a target acquiring a license and a type of the license are shown. In this example, it is shown that a floating license of an imaging function of a 4K image is an acquisition target.

Figure 8:
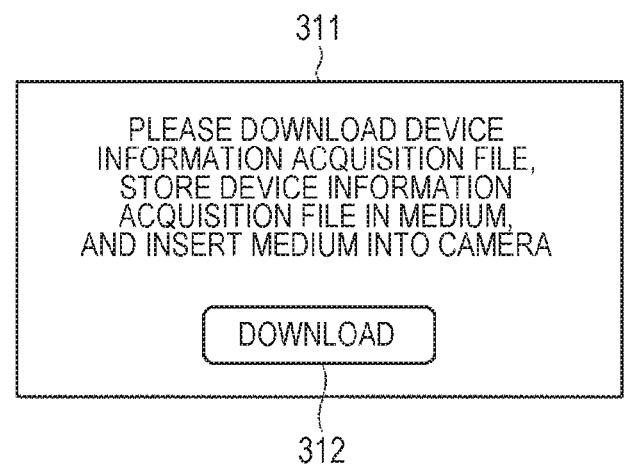
FIG. 8 is a diagram illustrating an example of a screen of the PC.

At a right end of the license information field 301B, an installation button 302 is displayed. When the installation button 302 is pressed, for example, a window 311 of FIG. 8 is displayed on the screen of the PC 21.

In the window 311, a message for prompting the user to download the device information acquisition file, store the device information acquisition file in the medium 22, and insert the medium 22 into the camera (electronic device 23) and a download button 312 are displayed. When the download button 312 is pressed, the PC 21 requests the server 11 to transmit the device information acquisition file, via the network 13.

In response to this request, the server 11 transmits the device information acquisition file to the PC 21 via the network 13 in step S31 of FIG. 13 as described later.

In step S2, the PC 21 receives the device information acquisition file transmitted from the server 11. Furthermore, the PC 21 stores the received device information acquisition file in the medium 22 according to, for example, an operation of the user.

In step S3, the electronic device 23 executes a command in the device information acquisition file.

Specifically, the user detaches the medium 22 in which the device information acquisition file is stored from the PC 21, and connects the medium 22 to the drive 207 of the electronic device 23.

The drive 207 reads the device information acquisition file stored in the medium 22 and supplies the read device information acquisition file to the control unit 203. The control unit 203 executes a device information acquisition command included in the device information acquisition file. Therefore, acquisition processing of device information is started.

Note that, for example, the processing of steps S1 to S3 may be omitted, and the acquisition processing of the device information may be started by operating the electronic device 23 by the user without using the device information acquisition command.

In step S4, the key generation unit 252 determines whether or not the device unique key has been generated. The key generation unit 252 determines that the device unique key has not been generated in a case where the device unique key is not stored in the storage unit 206, and the processing proceeds to step S5.

In step S5, the key generation unit 252 generates the device unique key. A generation method of the device unique key is not particularly limited. The storage control unit 256 causes the storage unit 206 to store the device unique key.

That is, the electronic device 23 generates the device unique key, which is a secret key unique to the electronic device 23, before generating a device information file for the first time after factory shipment. Therefore, it is not necessary to generate the device unique key at the time of the factory shipment and store the device unique key in the electronic device 23, such that a risk of leakage or the like of the device unique key is reduced. Furthermore, for example, by changing firmware of the electronic device 23 or the like, it is possible to change a generation method, a generation timing, or the like, of the device unique key, such that flexibility is improved.

Thereafter, the processing proceeds to step S6.

On the other hand, in step S4, the key generation unit 252 determines that the device unique key has been generated in a case where the device unique key is stored in the storage unit 206, the processing of step S5 is skipped, and the processing proceeds to step S6.

In step S6, the data generation unit 253 encrypts the device unique key with a server public key. Specifically, the data generation unit 253 reads the device unique key and the server public key from the storage unit 206. Note that the server public key is a public key corresponding to a server secret key possessed by the server 11, and is distributed to the electronic device 23 in advance. The data generation unit 253 encrypts the device unique key using the server public key. Therefore, security of the device unique key is ensured, such that tampering, eavesdropping, and the like, of the device unique key are prevented.

In step S7, the data generation unit 253 generates storage data including a device unique identification (ID) and the device unique key. Specifically, the data generation unit 253 reads the device unique ID from the storage unit 206. The device unique ID is an ID uniquely allocated to each electronic device 23, and includes, for example, a type name and a serial number of the electronic device 23. The data generation unit 253 generates storage data including the device unique ID and the encrypted device unique key.

In step S8, the data generation unit 253 calculates a hash value of the storage data using the device unique key. Note that a hash function used to calculate the hash value is not particularly limited.

In step S9, the data generation unit 253 generates a device information file including the storage data and the hash value. Therefore, security of the storage data is ensured using the device unique key.

This device information file is used by the server 11 to issue a license as a license request file for requesting issuance of the license.

In step S10, the data generation unit 253 stores the device information file in the medium 22 via the drive 207.

At this time, for example, the output unit 205 displays a window 321 of FIG. 9 under the control of the UI control unit 254. In the window 321, a message for notifying the user that the device information file has been written out and an OK button 322 are displayed. When the OK button 322 is pressed, the window 321 is closed.

In step S11, the PC 21 transmits the device information file to the server 11.

For example, the user detaches the medium 22 from the electronic device 23, and connects the medium 22 to the PC 21. The PC 21 displays, for example, a window 331 of FIG. 10 on the screen.

In the window 331, a message for prompting the user to upload the device information file acquired from the camera (electronic device 23) and an upload button 332 are displayed.

When the upload button 332 is pressed, the PC 21 reads the device information file from the medium 22 and transmits the read device information file to the server 11 via the network 13.

In response to this transmission, the server 11 receives the device information file in step S32 of FIG. 13 as described later.

In step S12, the PC 21 determines whether or not to acquire a license communication file.

The server 11 transmits a display control file for finally confirming execution of installation of the license via the network 13 in step S34 of FIG. 13 as described later, in a case where it is determined that the device information file received from the PC 21 is valid.

The PC 21 displays a window 341 of FIG. 11 on the screen on the basis of the display control file.

In the window 341, a device unique ID of the camera (electronic device 23), a message for confirming the execution of the installation of the license in the camera, and an installation button 342 are displayed. When the installation button 342 is pressed, for example, a window 351 of FIG. 12 is displayed on the screen of the PC 21.

In the window 351, a message for prompting the user to download the license communication file, store the license communication file in the medium 22, and insert the medium 22 into the camera (electronic device 23) and a download button 352 are displayed. Then, when the download button 352 is pressed, the PC 21 determines to acquire the license communication file and requests the server 11 to transmit the license communication file via the network 13. Thereafter, the processing proceeds to step S13.

In response to this request, the server 11 transmits the license communication file including an installation key and the like in step S40 of FIG. 13 as described later.

In step S13, the PC 21 receives the license communication file from the server 11 via the network 13.

In step S14, the PC 21 stores the license communication file in the medium 22 according to, for example, an operation of the user.

Thereafter, the license acquisition processing ends.

On the other hand, in step S12, the PC 21 determines not to acquire the license communication file in a case where the display control file for finally confirming the execution of the installation of the license has not been received or in a case where an instruction on the acquisition of the license communication file has not been given. Thereafter, the processing of steps S13 and S14 is skipped, such that the license acquisition processing ends without acquiring the license communication file.

<License Issuance Processing>

Next, license issuance processing executed by the server 11, corresponding to the license acquisition processing by the client 12 of FIG. 6 will be described with reference to a flowchart of FIG. 13.

Figure 6:
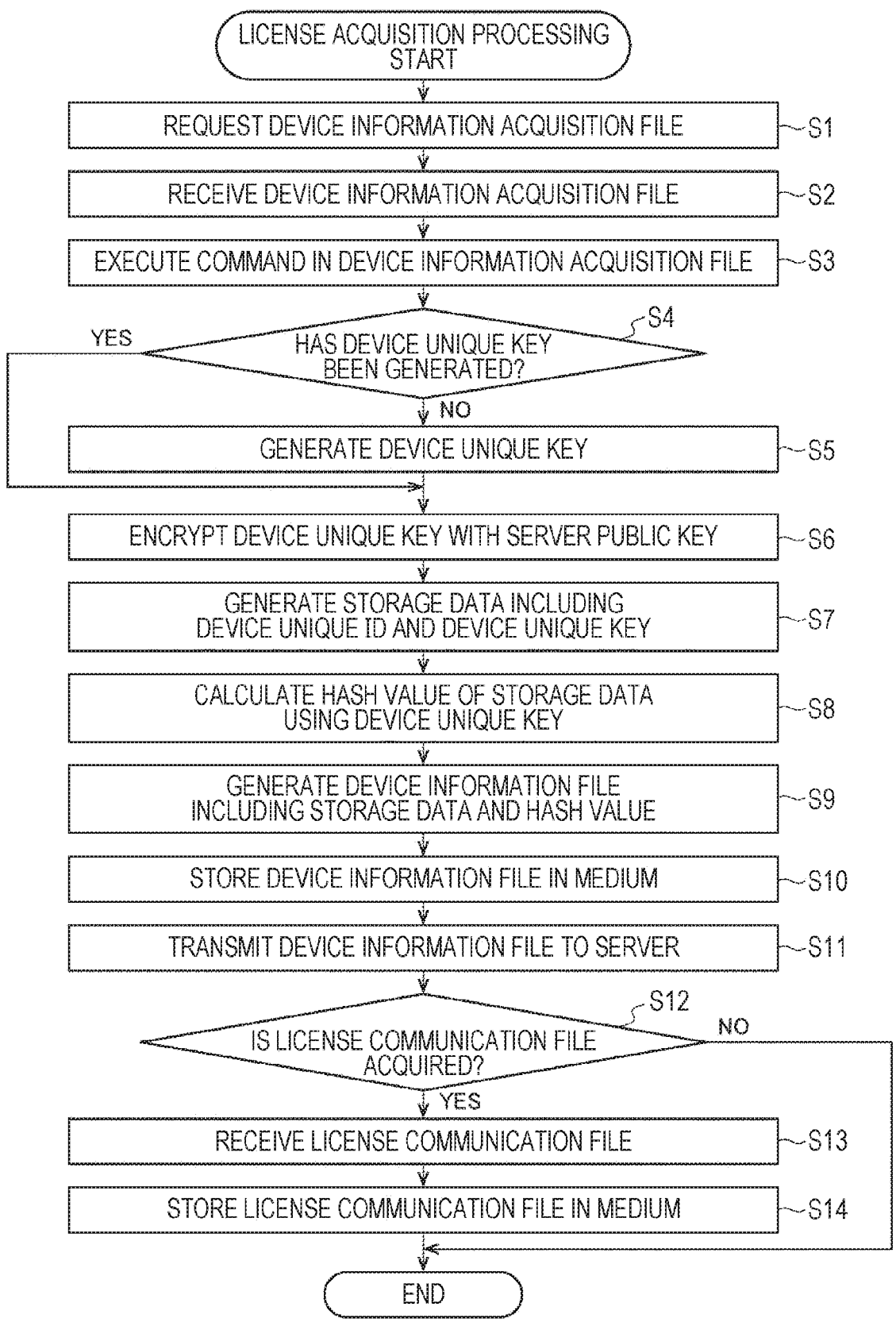
FIG. 6 is a flowchart for describing license acquisition processing executed by a client.

Note that this processing is started, for example, when the server 11 has received the request for the device information acquisition file from the PC 21 in step S1 of FIG. 6 described above.

In step S31, the server 11 transmits the device information acquisition file. Specifically, the data generation unit 152 generates the device information acquisition file including the device information acquisition command. The communication unit 103 transmits the device information acquisition file to the PC 21 via the network 13 under the control of the communication control unit 154.

Note that the processing of step S31 can be omitted by omitting the processing of steps S1 to S3 of FIG. 6 of the electronic device 23 as described above.

In step S32, the server 11 receives the device information file. Specifically, the communication control unit 154 receives the device information file transmitted from the PC 21 in the processing of step S11 of FIG. 6 described above, via the communication unit 103.

In step S33, the license management unit 151 determines whether or not the device information file is valid. Specifically, the license management unit 151 reads the server secret key corresponding to the server public key used to encrypt the device unique key included in the device information file, from the storage unit 106. The license management unit 151 decrypts the device unique key using the read server secret key.

Next, the license management unit 151 calculates a hash value of the storage data included in the device information file using the same hash function as that of the electronic device 23 and the decrypted device unique key. Then, the license management unit 151 determines that the device information file is valid in a case where the calculated hash value coincides with a hash value in the device information file, and the processing proceeds to step S34.

Therefore, tampering or the like of the device unique ID and the device unique key in the storage data is prevented.

In step S34, the license management unit 151 determines whether or not to transmit the license communication file.

Specifically, the UI control unit 153 generates the display control file for finally confirming the execution of the installation of the license. The communication unit 103 transmits the display control file to the PC 21 via the network 13 under the control of the communication control unit 154.

Then, the license management unit 151 determines to transmit the license communication file in a case where the PC 21 requests the server to transmit the license communication file in step S12 of FIG. 6 described above, and the processing proceeds to step S35.

In step S35, the license management unit 151 generates an installation key.

Figure 14:
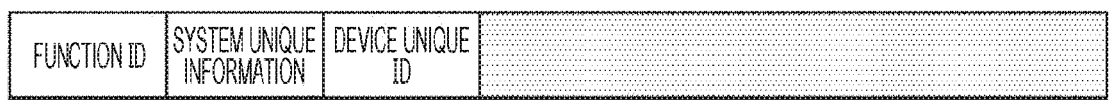
FIG. 14 is a diagram illustrating a format example of an installation key.

FIG. 14 illustrates an example of a format of an installation key.

The installation key includes a function ID, system unique information, and a device unique ID.

The function ID is an ID for identifying a function that becomes a target of a license.

The system unique information is a serial number including alphanumeric characters generated by the server 11, and is different for every installation key.

The device unique ID is a device unique ID of the electronic device 23 that becomes a target to which the license is to be provided, and the device unique ID of the electronic device 23 included in the device information file is used.

In step S36, the data generation unit 152 generates storage data including the installation key.

In step S37, the data generation unit 152 calculates a hash value of the storage data using the device unique key. That is, the data generation unit 152 calculates a hash value of the storage data using the same hash function as that of the electronic device 23 and the device unique key included in the device information file.

In step S38, the data generation unit 152 generates a license communication file including the storage data and the hash value. Specifically, the data generation unit 152 generates a signature by encrypting the hash value using the server secret key. Then, the data generation unit 152 generates a license communication file including the storage data and the signature (encrypted hash value). Therefore, security of the storage data is ensured using the device unique key.

Note that the license communication file is also an installation file used to install the license in the electronic device 23.

In step S39, the server 11 stores license information. For example, the storage control unit 155 causes the storage unit 106 to store license information including, for example, a combination of the current date and time of the RTC 105, the device unique ID, the device unique key, and the installation key.

In step S40, the communication unit 103 transmits the license communication file to the PC 21 under the control of the communication control unit 154.

Thereafter, the license issuance processing ends.

On the other hand, in step S34, the license management unit 151 determines not to transmit the license communication file in a case where the PC 21 does not request the server to transmit the license communication file in step S12 of FIG. 6 described above, the processing of steps S35 to S40 is skipped, and the license issuance processing ends. That is, the generation of the installation key and the transmission of the license communication file are not performed.

Furthermore, in step S33, the license management unit 151 determines that the device information file is not valid in a case where the calculated hash value does not coincide with the hash value in the device information file, the processing of steps S34 to S40 is skipped, and the license issuance processing ends. That is, the generation of the installation key and the transmission of the license communication file are not performed.

<License Start Processing>

Figure 15:
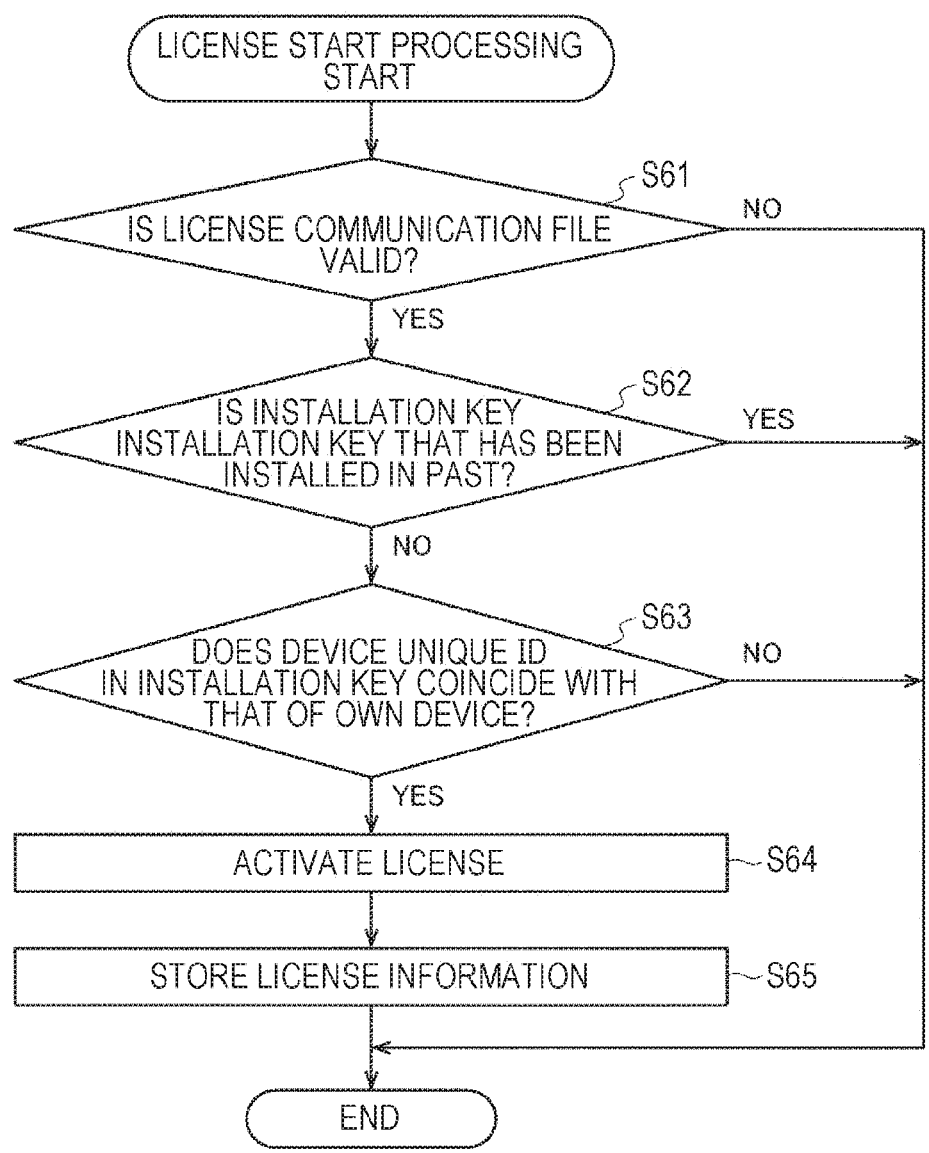
FIG. 15 is a flowchart for describing license start processing executed by the client.

Next, license start processing executed by the electronic device 23 will be described with reference to FIG. 15.

Figure 16:
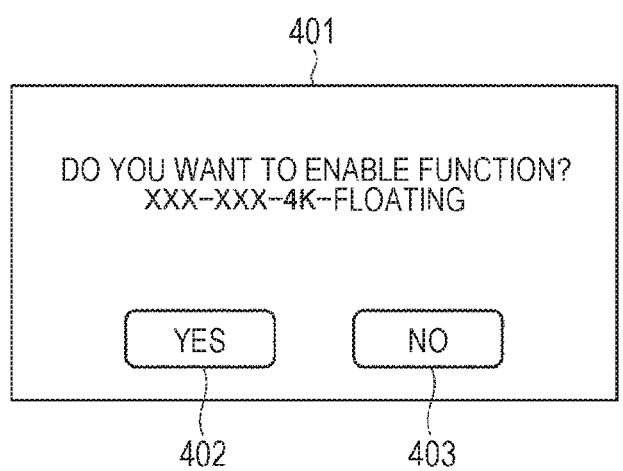
FIG. 16 is a diagram illustrating an example of a screen of the electronic device.

For example, when the medium 22 in which the license communication file is stored is connected to the drive 207 of the electronic device 23, the output unit 205 displays a window 401 of FIG. 16 under the control of the UI control unit 254, for example.

In the window 401, a type name of the electronic device 23, a type of function and a license type, and a message for confirming whether or not to enable the function are displayed. Furthermore, a YES button 402 and a NO button 403 are displayed in the window 401. Then, in a case where the YES button 402 is pressed, the license start processing is started. On the other hand, in a case where the NO button 403 is pressed, the license start processing is not started.

In step S61, the license management unit 251 determines whether or not the license communication file is valid. Specifically, the license management unit 251 reads the license communication file from the medium 22 via the drive 207. Furthermore, the license management unit 251 reads the device unique key and the server public key from the storage unit 206.

The license management unit 251 decrypts the signature included in the license communication file using the server public key. Therefore, the hash value of the storage data included in the license communication file is obtained. Furthermore, the license management unit 251 calculates the hash value of the storage data of the license communication file using the same hash function as that of the server 11 and the device unique key. Then, the license management unit 251 determines that the license communication file is valid in a case where the calculated hash value coincides with a hash value in the license communication file, and the processing proceeds to step S62.

Therefore, tampering or the like of the installation key in the storage data is prevented.

In step S62, the license management unit 251 determines whether or not the installation key is an installation key that has been installed in the past. The license management unit 251 determines that the installation key is not the installation key that has been installed in the past in a case where an installation key coinciding with the installation key included in the license communication file is not stored in the storage unit 206, and the processing proceeds to step S63.

Therefore, it is prevented that the license is installed doubly using the installation key that has been installed in the past.

In step S63, the license management unit 251 determines whether or not the device unique ID in the installation key coincides with that of an own device. The license management unit 251 determines that the device unique ID in the installation key coincides with that of the own device in a case where the device unique ID in the installation key coincides with the device unique ID of the electronic device 23 stored in the storage unit 206, and the processing proceeds to step S64.

Therefore, it is prevented that the license is installed using an installation key for another electronic device 23.

In step S64, the license management unit 251 activates the license. That is, the license management unit 251 makes a function whose license is given by the installation key usable.

Note that software realizing the function may be installed in the electronic device 23 in advance or may be installed at this time.

In step S65, the electronic device 23 stores the license information. For example, the storage control unit 256 causes the storage unit 206 to store the license information including the installation key.

Thereafter, the license start processing ends.

On the other hand, in a case where it is determined in step S63 that the device unique ID in the installation key does not coincide with that of the own device, the license start processing ends.

This is, for example, a case where it has been attempted to connect the medium 22 to a different electronic device 23 to install the license, a case where an erroneous license communication file has been received, a case where the installation key has been tampered with, or the like.

Furthermore, in step S62, the license management unit 251 determines that the installation key is the installation key that has been installed in the past in a case where the installation key coinciding with the installation key included in the license communication file is stored in the storage unit 206, and the license start processing ends.

This is a case where it has been attempted to install the previously installed license again.

Moreover, in step S61, the license management unit 251 determines that the license communication file is not valid in a case where the calculated hash value does not coincide with the hash value in the license communication file, and the license start processing ends.

This is a case where tampering or the like of the license communication file has been performed.

<License Return Processing>

Next, license return processing executed by the client 12 will be described with reference to a flowchart of FIG. 17.

In step S101, the PC 21 requests a DeActivate request file.

Figure 18:
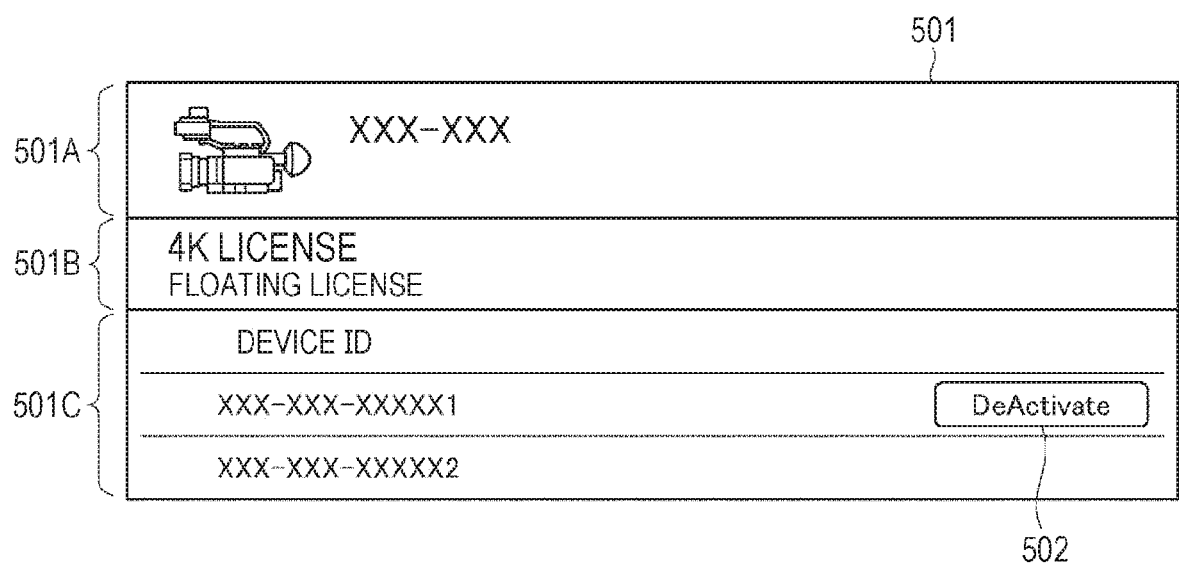
FIG. 18 is a diagram illustrating an example of a screen of the PC.

For example, the PC 21 accesses the server 11 via the network 13 according to an operation of the user to display a screen for returning a license of a function activated in the electronic device 23. For example, a window 501 of FIG. 18 is displayed on the screen of the PC 21.

The window 501 is divided into a device information field 501A, a license information field 501B, and a license detailed information field 501C.

At a left end of the device information field 501A, an image and a type name of the electronic device 23 are displayed laterally side by side.

At a left end of the license information field 501B, a function that becomes a target returning a license and a type of the license are shown. In this example, it is shown that a floating license of an imaging function of a 4K image is a re-issuance target.

At a left end of the license detailed information field 501C, a device unique ID of an electronic device 23 that can use a function corresponding to a license to be returned among electronic devices 23 owned by the user is displayed.

Figure 19:
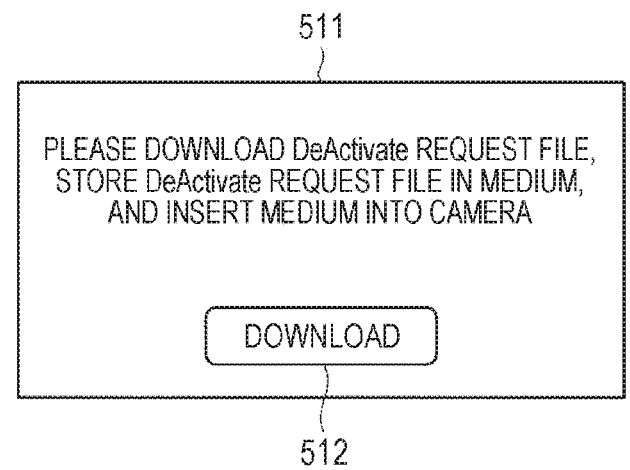
FIG. 19 is a diagram illustrating an example of a screen of the PC.

At a right end of the license detailed information field 501C, a DeActivate button 502 is displayed for the electronic device 23 in which the license is currently activated. When the DeActivate 502 is pressed, for example, a window 511 of FIG. 19 is displayed on the screen of the PC 21.

In the window 511, a message for prompting the user to download the DeActivate request file, store the DeActivate request file in the medium 22, and insert the medium 22 into the camera (electronic device 23) and a download button 512 are displayed. When the download button 512 is pressed, the PC 21 requests the server 11 to transmit the DeActivate request file, via the network 13.

Figure 24:
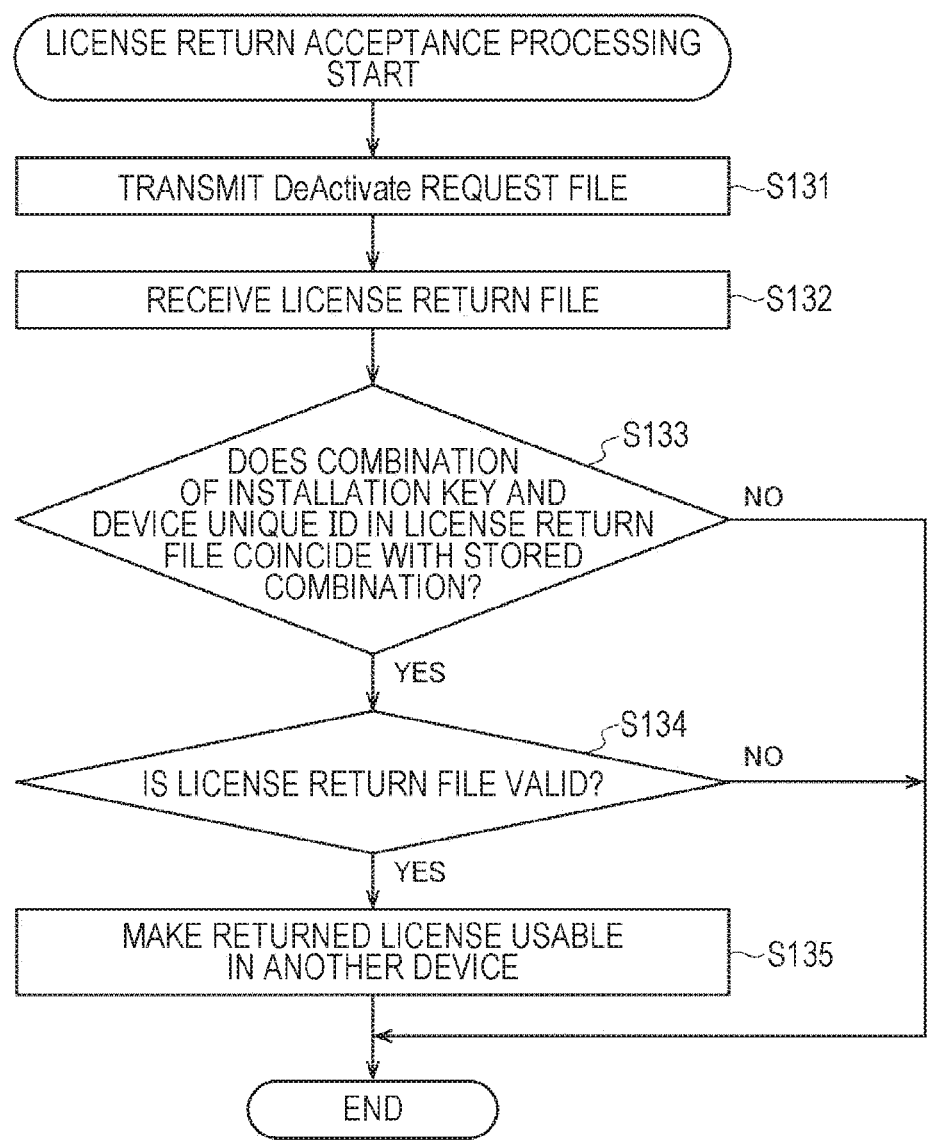
FIG. 24 is a flowchart for describing license return acceptance processing executed by the server.

In response to this request, the server 11 transmits the DeActivate request file to the PC 21 via the network 13 in step S131 of FIG. 24 as described later.

In step S102, the PC 21 receives the DeActivate request file transmitted from the server 11. Furthermore, the PC 21 stores the received DeActivate request file in the medium 22 according to, for example, an operation of the user.

In step S103, the electronic device 23 executes a command in the DeActivate request file.

Specifically, the user detaches the medium 22 in which the DeActivate request file is stored from the PC 21, and connects the medium 22 to the drive 207 of the electronic device 23.

The drive 207 reads the DeActivate request file stored in the medium 22 and supplies the read DeActivate request file to the control unit 203. The control unit 203 executes a DeActivate request command included in the DeActivate request file.

Figure 20:
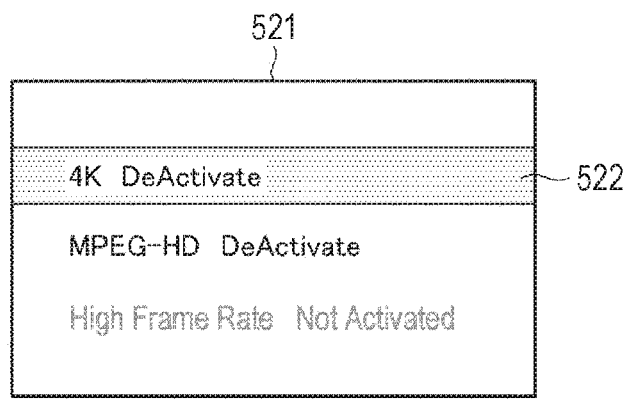
FIG. 20 is a diagram illustrating an example of a screen of the electronic device.
Figure 21:
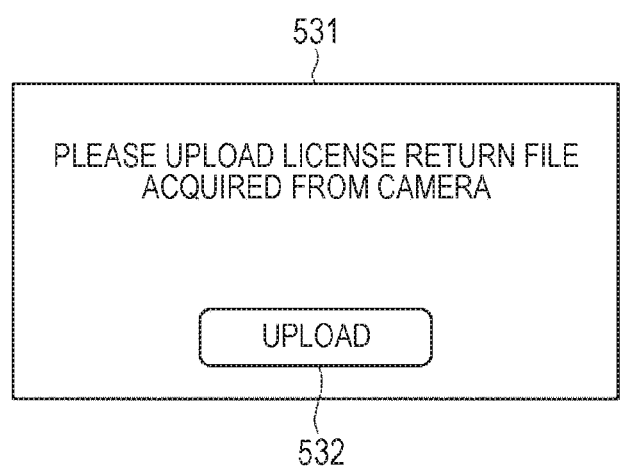
FIG. 21 is a diagram illustrating an example of a screen of the PC.
Figure 22:
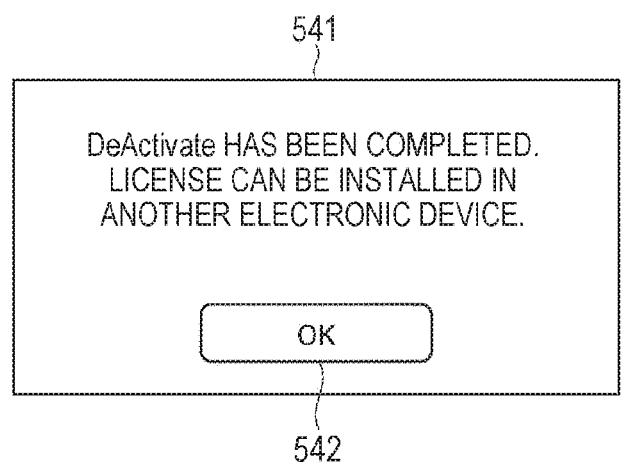
FIG. 22 is a diagram illustrating an example of a screen of the PC.

Therefore, the output unit 205 displays, for example, a window 521 of FIG. 20 under the control of the UI control unit 254.

In the window 521, a menu of functions that can be used in the electronic device 23 is displayed. In this example, three functions of 4K, MPEG-HD, and High Frame Rate are displayed. Among them, with respect to 4K and MPEG-HD, it is shown that a license is activated at a current point in time, such that 4K and MPEG-HD can be DeActivated. On the other hand, it is shown that High Frame Rate is grayed out, such that a license is deactivated.

Note that, for example, the processing of steps S101 to S103 may be omitted, and the license return processing may be started by displaying the window 521 of FIG. 20 on the electronic device 23 by operating the electronic device 23 by the user without using the DeActivate request command.

In step S104, the license management unit 251 deactivates the license.

For example, the user selects a function of returning a license (a function of deactivating a license) using a cursor 522 in the window 521 of FIG. 20. Then, when the selection of the function of returning the license is confirmed, the license management unit 251 makes the function unusable.

In step S105, the data generation unit 253 generates storage data including the device unique ID and an installation key of the deactivated license. Specifically, the data generation unit 253 reads the device unique ID and the installation key of the deactivated license from the storage unit 206. The data generation unit 253 generates storage data including the read device unique ID and installation key.

In step S106, a hash value of the storage data is calculated using the device unique key, similarly to the processing of step S8 of FIG. 6.

In step S107, the data generation unit 253 generates a license return file including the storage data and the hash value.

In step S108, the data generation unit 253 stores the license return file in the medium 22 via the drive 207.

In step S109, the PC 21 transmits the license return file to the server 11.

For example, the user detaches the medium 22 from the electronic device 23, and connects the medium 22 to the PC 21. For example, the PC 21 displays a window 531 of FIG. 21 on the screen.

In the window 531, a message for prompting the user to upload the license return file acquired from the camera (electronic device 23) and an upload button 532 are displayed.

When the upload button 532 is pressed, the PC 21 reads the license return file from the medium 22 and transmits the read license return file to the server 11 via the network 13.

In step S110, the PC 21 determines whether or not DeActivate has been completed. The PC 21 determines that DeActivate has been completed in a case where a display control file transmitted from the server 11 and notifying the user that DeActivate of the license has been completed has been received in step S135 of FIG. 24 as described later, and the processing proceeds to step S111.

In step S111, the PC 21 notifies the user of return completion of the license. For example, the PC 21 displays a window 541 of FIG. 22 on the screen.

Figure 23:
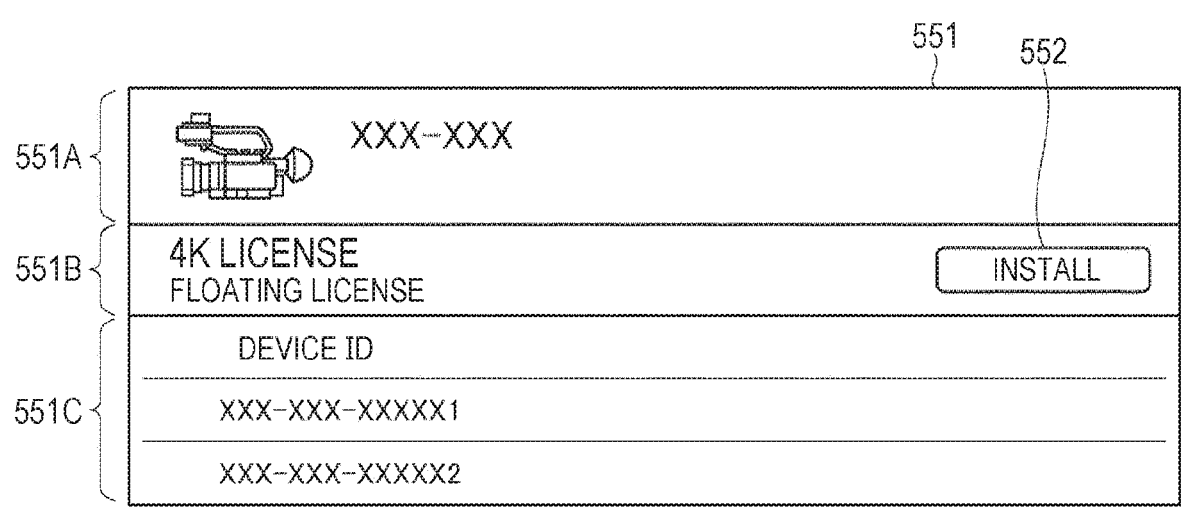
FIG. 23 is a diagram illustrating an example of a screen of the PC.

In the window 541, a message for notifying the user that DeActivate has been completed and the returned license can be installed in another electronic device 23 and an OK button 542 are displayed. When the OK button 542 is pressed, for example, a window 551 of FIG. 23 is displayed on the screen of the PC 21.

The window 551 is divided into a device information field 551A, a license information field 551B, and a license detailed information field 551C, similarly to the window 501 of FIG. 18, and has display contents substantially similar to those of the window 501. However, the window 551 is different from the window 501 in that the DeActivate button 502 disappears and an installation button 552 is displayed at a right end of the license information field 501B.

When the installation button 552 is pressed, the license acquisition processing described above with reference to FIG. 6 is started. Therefore, for example, the returned license can be installed in another electronic device 23.

Thereafter, the license return processing ends.

On the other hand, in step S110, the PC 21 determines that DeActivate has not been completed in a case where the display control file notifying the user that DeActivate of the license has been completed has not been received from the server 11, the processing of step S111 is skipped, and the license return processing ends.

<License Return Acceptance Processing>

Next, license return acceptance processing executed by the server 11, corresponding to the license return processing by the client 12 of FIG. 17 will be described with reference to a flowchart of FIG. 24.

Figure 17:
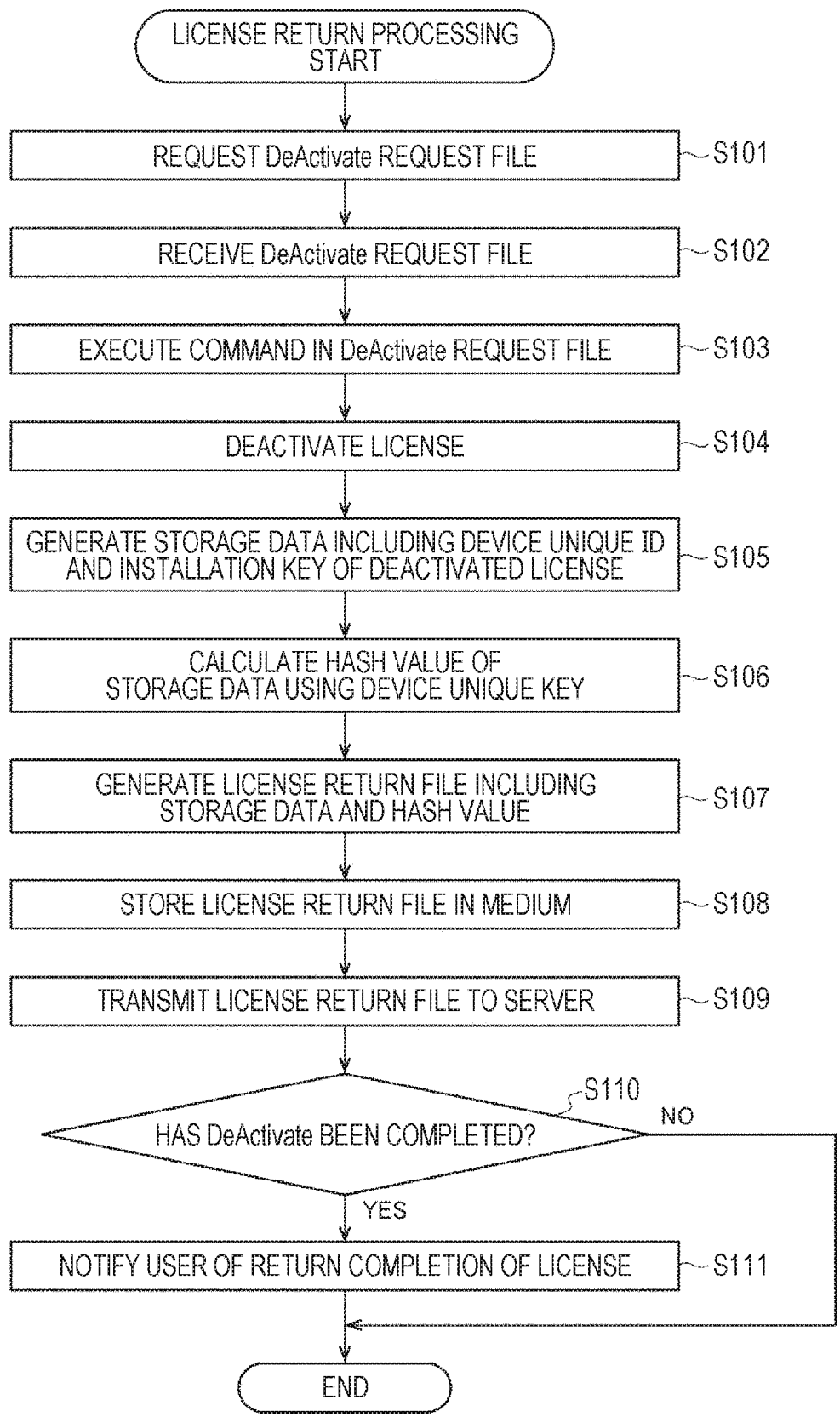
FIG. 17 is a flowchart for describing license return processing executed by the client.

Note that this processing is started, for example, when the server 11 has received the request for the DeActivate request file from the PC 21 in step S101 of FIG. 17 described above.

In step S131, the server 11 transmits the DeActivate request file. Specifically, the data generation unit 152 generates the DeActivate request file including the DeActivate request file command. The communication unit 103 transmits the DeActivate request file to the PC 21 via the network 13 under the control of the communication control unit 154.

Note that the processing of step S131 can be omitted by omitting the processing of steps S101 to S1033 of FIG. 17 of the electronic device 23 as described above.

In step S132, the server 11 receives the license return file. Specifically, the communication control unit 154 receives the license return file transmitted from the PC 21 in the processing of step S109 of FIG. 17 described above, via the communication unit 103.

In step S133, the license management unit 151 determines whether or not a combination of a device unique ID and an installation key in the license return file coincides with a stored combination. Specifically, the license management unit 151 retrieves license information in which a combination of a device unique ID and an installation key coincides with the combination of the device unique ID and the installation key in the license return file, among the license information stored in the storage unit 106. Then, the license management unit 151 determines that the combination of the device unique ID and the installation key in the license return file coincides with the stored combination in a case where the license information in which the combination of the device unique ID and the installation key coincides with the combination of the device unique ID and the installation key in the license return file has been detected, and the processing proceeds to step S134.

In step S134, the license management unit 151 determines whether or not the license return file is valid. Specifically, the license management unit 151 reads the device unique key included in the license information detected in the processing of step S133 from the storage unit 106.

The license management unit 151 calculates a hash value of the storage data included in the license return file using the same hash function as that of the electronic device 23 and the read device unique key. Then, the license management unit 151 determines that the license return file is valid in a case where the calculated hash value coincides with a hash value in the license return file, and the processing proceeds to step S135.

Therefore, tampering or the like of the device unique ID and the installation key in the storage data is prevented.

Furthermore, therefore, it is guaranteed that a combination of the device unique key used to calculate the hash value in the license return file and the installation key and the device unique ID in the license return file coincides with that of the device unique key, the installation key, and the device unique ID stored in the storage unit 106.

In step S135, the license management unit 151 makes the returned license usable. Specifically, for example, the license management unit 151 updates information regarding the returned license when the returned license is deactivated in the electronic device 23 returning the license and is usable in another electronic device. For example, the license management unit 151 updates the license information detected in the processing of step S133 to license information that has been returned and deactivated, and causes the storage unit 106 to store the updated license information. Furthermore, for example, the license management unit 151 causes the storage unit 106 to store information indicating that the installation key of the returned license can be newly issued.

Furthermore, the UI control unit 153 also generates a display control file for notifying the user that DeActivate of the license has been completed. The communication unit 103 transmits the display control file to the PC 21 via the network 13 under the control of the communication control unit 154. In such a manner, the return of the license is accepted.

Thereafter, the license return acceptance processing ends.

On the other hand, in step S134, the license management unit 151 determines that the license return file is not valid in a case where the calculated hash value does not coincide with the hash value in the license return file, the return of the license is not accepted, and the license return processing ends.

Furthermore, in step S133, the license management unit 151 determines that the combination of the device unique ID and the installation key in the license return file does not coincide with the stored combination in a case where the license information in which the combination of the device unique ID and the installation key coincides with the combination of the device unique ID and the installation key in the license return file has not been detected, the return of the license is not accepted, and the license return processing ends.

In such a manner, even though the server 11 and the electronic device 23 do not directly communicate with each other, the floating license provided by the server 11 can be shared and used by a plurality of electronic devices 23.

Furthermore, even though the server 11 and the electronic device 23 do not directly communicate with each other, the license can be installed in the electronic device 23 in a safe status to make the function of the electronic device 23 usable.

Moreover, even though the server 11 and the electronic device 23 do not directly communicate with each other, the license can be returned from the electronic device 23 to the server 11 in a safe status, such that it is possible to make the license usable in another electronic device 23.

Furthermore, the license can be returned by one-way processing of only transmitting the license return file from the electronic device 23 to the server 11 via the medium 22 and the PC 21, such that processing required for returning the license can be reduced. That is, convenience in a case where the floating license is used in the electronic device 23 is improved.

Moreover, a different device unique key is generated in each electronic device 23, and security of a communication path between each electronic device 23 and the server 11 is secured by each different device unique key. Therefore, even though a device unique key of one electronic device 23 is hacked, the other electronic devices 23 are not affected by such hacking, and the floating license can be safely used in the other electronic devices 23.

2. Modification

Hereinafter, a modification of the embodiment of the present technology described above will be described For example, another information processing apparatus (for example, a smartphone, a tablet, and the like) that can communicate with the server 11 and can read and write data from and to the medium 22 may be used, instead of the PC 21.

Furthermore, for example, the server 11 and the electronic device 23 may exchange data with each other via another information processing apparatus (for example, a smartphone, a tablet, or the like) without using the medium 22.

FIGS. 25A, 25B, 25C, 26A, and 26B illustrate examples of cases where the server 11 and the electronic device 23 exchange data with each other via a smartphone 601.

For example, the server 11 and the smartphone 601 perform communication based on a 4th generation (4G) mobile communication standard (hereinafter, referred to as 4G communication). The electronic device 23 and the smartphone 601 perform communication with each other via Wi-Fi.

In this case, since the smartphone 601 cannot perform the 4G communication and the Wi-Fi communication at the same time, exchange of data is sequentially performed, similarly to a case of using the medium 22 described above.

Figure 25A:
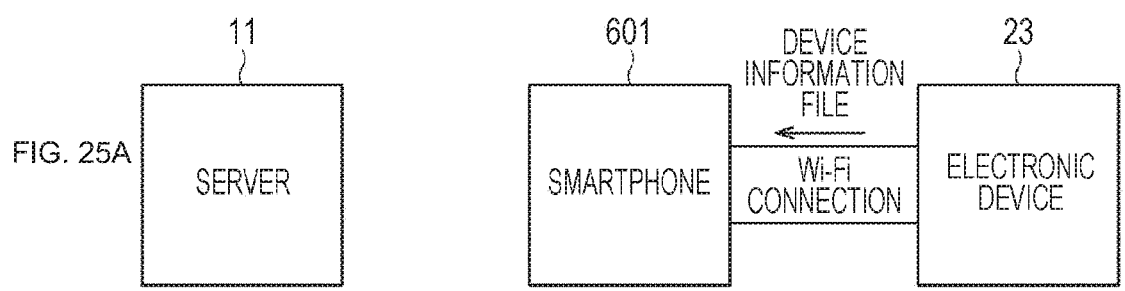
FIGS. 25A, 25B, and 25C are diagrams illustrating a modification of a method of exchanging data between the server and the electronic device.
Figure 25B:
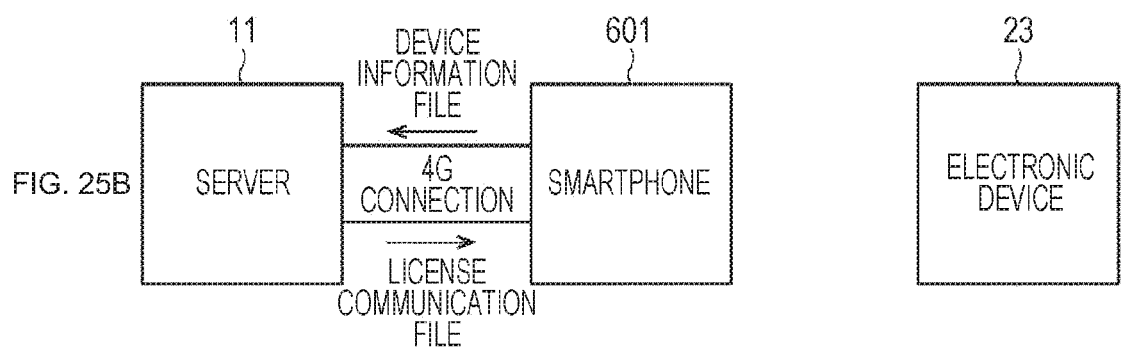
Figure 25C:
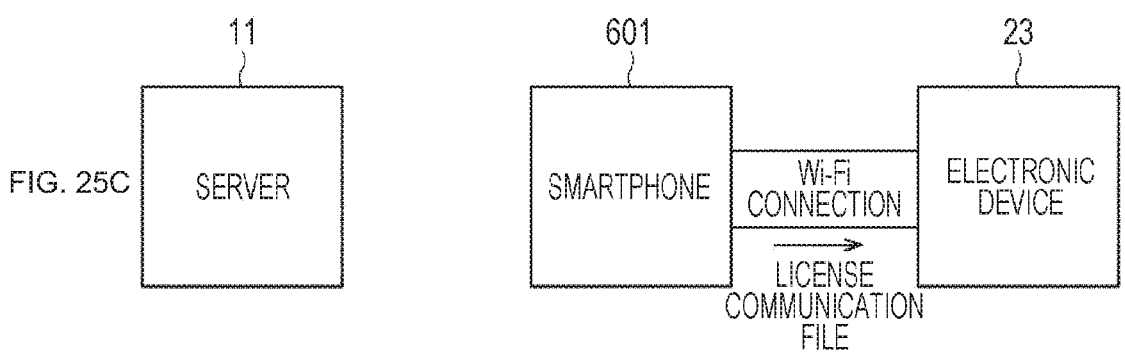

Specifically, for example, as illustrated in FIGS. 25A, 25B, and 25C, first, the electronic device 23 and the smartphone 601 are connected to each other by the Wi-Fi, and the electronic device 23 transmits a device information file to the smartphone 601.

Next, the server 11 and the smartphone 601 are connected to each other by the 4G communication, and the smartphone 601 transmits the device information file to the server 11. The server 11 generates a license communication file using the received device information file and transmits the license communication file to the smartphone 601.

Next, the electronic device 23 and the smartphone 601 are reconnected to each other by the Wi-Fi, and the electronic device 23 transmits the license communication file to the smartphone 601. Then, the electronic device 23 installs a license using the license communication file.

Figure 26A:
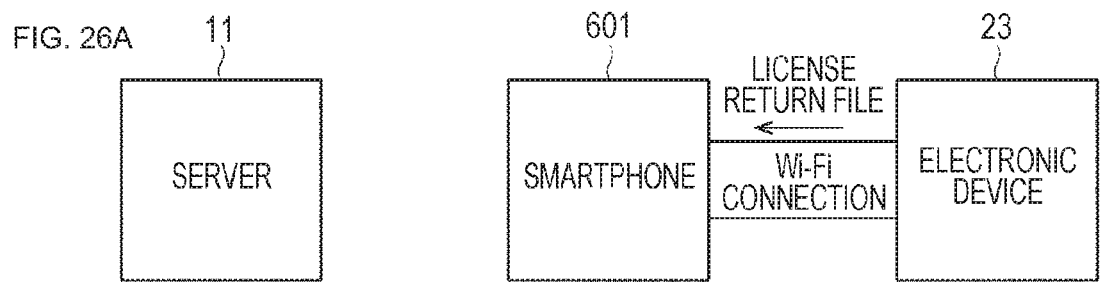
FIGS. 26A and 26B are diagrams illustrating a modification of a method of exchanging data between the server and the electronic device.
Figure 26B:
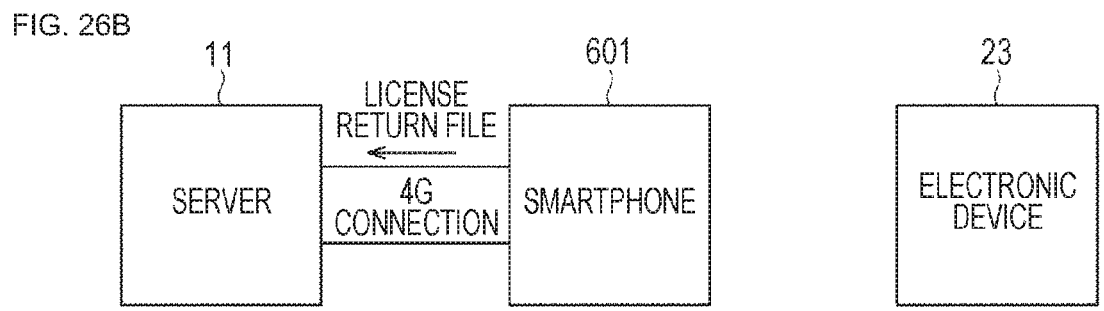

Furthermore, for example, as illustrated in FIGS. 26A and 26B, first, the electronic device 23 and the smartphone 601 are connected to each other by the Wi-Fi, and the electronic device 23 transmits a license return file to the smartphone 601.

Next, the server 11 and the smartphone 601 are connected to each other by the 4G communication, and the smartphone 601 transmits the license return file to the server 11. Therefore, the license is returned from the electronic device 23 to the server 11.

In such a manner, the license provided by the server 11 can be installed in the electronic device 23 or the license can be returned from the electronic device 23 to the server 11, without using the media 22 and without performing direct communication between the server 11 and the electronic device 23. Furthermore, since security of a communication path between the server 11 and the electronic device 23 is secured using a device unique key, tampering or the like of data is prevented.

Note that, for example, short-range wireless communication such as Bluetooth (registered trademark), near field communication (NFC), and the like may be used as communication between the electronic device 23 and the smartphone 601.

Therefore, it becomes possible for the server 11 and the electronic device 23 to directly communicate with each other via the smartphone 601. However, in this case, the electronic device 23 needs to support the short-range wireless communication.

Moreover, an example in which the return of the license is accepted in a case where the combination of the device unique key used to calculate the hash value in the license return file and the installation key and the device unique ID in the license return file coincides with that of the device unique key, the installation key, and the device unique ID stored in the storage unit 106 has been described in the above description.

On the other hand, for example, in a case where a combination of the device unique key used to calculate the hash value in the license return file and the installation key in the license return file coincides with that of the device unique key and the installation key stored in the storage unit 106, the return of the license may be accepted. In this case, for example, the processing of step S133 can be omitted or the device unique ID cannot be included in the license return file.

In this case, for example, in the storage unit 106, a hash value of the storage data in the license return file is calculated using a device unique key combined with an installation key coinciding with the installation key in the license return file. Then, in a case where the calculated hash value coincides with the hash value in the license return file, the return of the license is accepted.

Furthermore, the formats of the installation keys of FIG. 14 are examples, and can be appropriately changed. For example, some of the data included in the installation key are not stored in the installation key, and may be stored in a file such as the license communication file or the like for transmitting the installation key.

Moreover, for example, in a case where return of the license from the client 12 to the server 11 is performed, an installation key management ID may be used instead of the installation key having a long data length.

Figure 13:
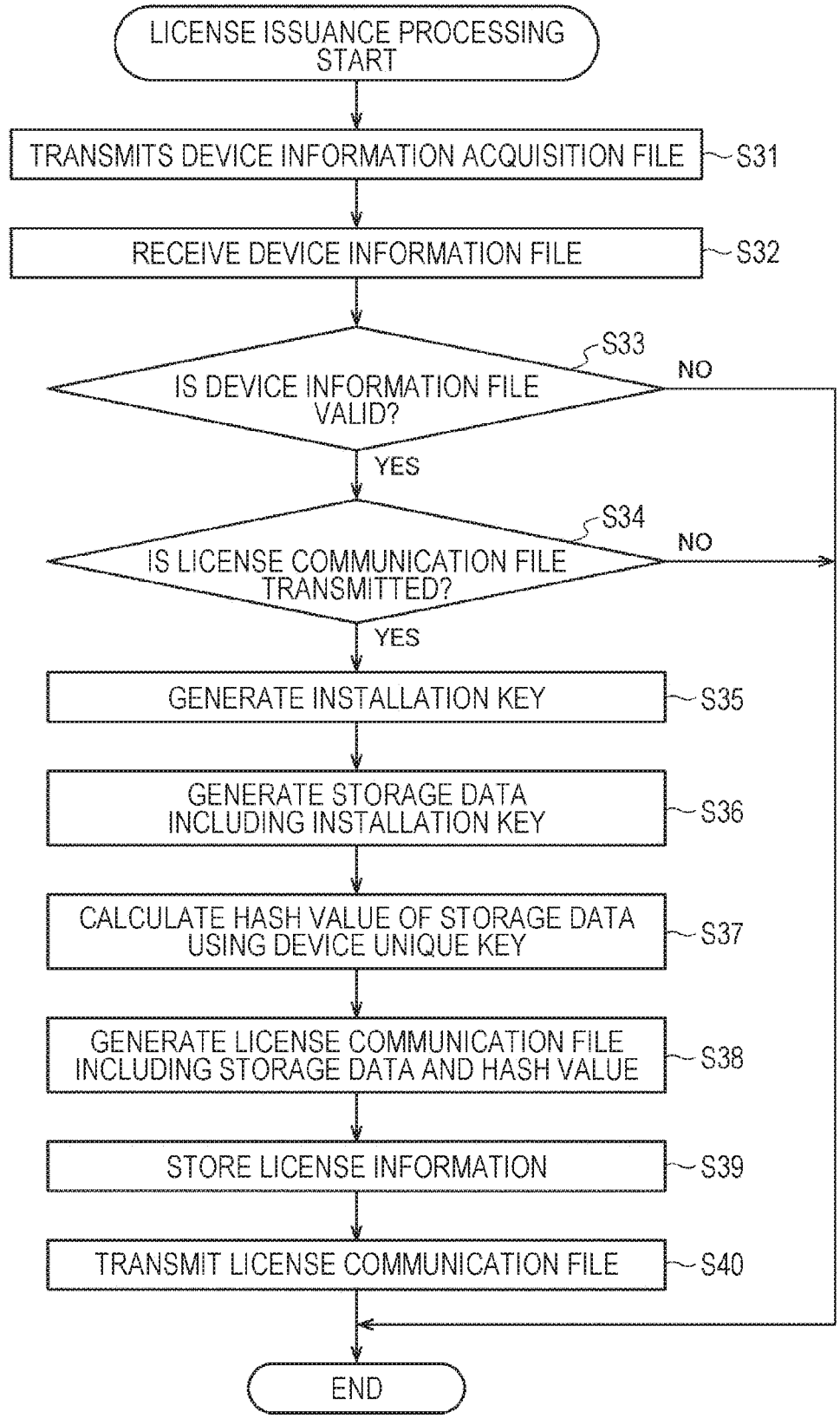
FIG. 13 is a flowchart for describing license issuance processing executed by the server.

For example, in step S35 of FIG. 13, the license management unit 151 of the server 11 generates the installation key and an installation key management ID corresponding to the installation key. The installation key management ID is an ID having a data length shorter than that of the installation key and unique to the installation key (different for every installation key). It is possible to identify the installation key corresponding to the license of each function by this installation key management ID.

Furthermore, for example, in step S36 of FIG. 13, the data generation unit 152 of the server 11 generates storage data including the installation key and the installation key management ID corresponding to the installation key. A license communication file including this storage data is transmitted from the server 11 to the client 12.

Moreover, for example, in step S39 of FIG. 13, the storage control unit 155 causes the storage unit 106 to store license information including a combination of the current date and time of the RTC 105, the device unique ID, the device unique key, the installation key, the installation key management ID.

On the other hand, for example, in step S105 of FIG. 17, the data generation unit 253 of the client 12 generates storage data including installation key information including the installation key management ID corresponding to the installation key of the deactivated license and the device unique ID. A license return file including this storage data is transmitted from the client 12 to the server 11.

Then, for example, in step S133 of FIG. 17, the license management unit 151 of the server 11 can determine that the license return file is valid in a case where license information coinciding with a combination of the device unique ID and the installation key management ID in the license return file, in other words, license information coinciding with a combination of the device unique ID and the installation key corresponding to the installation key management ID in the license return file has been detected.

Note that, for example, the installation key itself may be included or both of the installation key and the installation key management ID may be included in the installation key information included in the license return information. The former case is similar to the embodiment described above with reference to FIGS. 1 to 24.

Furthermore, for example, system unique information that is a part of the installation key may be included in the installation key information included in the license return information. The system unique information is an ID different for every installation key, as described above. Therefore, for example, in step S133 of FIG. 17, the license management unit 151 of the server 11 can determine that the license return file is valid in a case where license information coinciding with a combination of the device unique ID and the installation key including the system unique information in the license return file has been detected.

Moreover, an example in which the information is transmitted and received mainly in a file format between the server 11 and the client 21 has been described in the above description, but any other format can also be used as a format of information to be transmitted and received.

3. Others

<Configuration Example of Computer>

The series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 27:
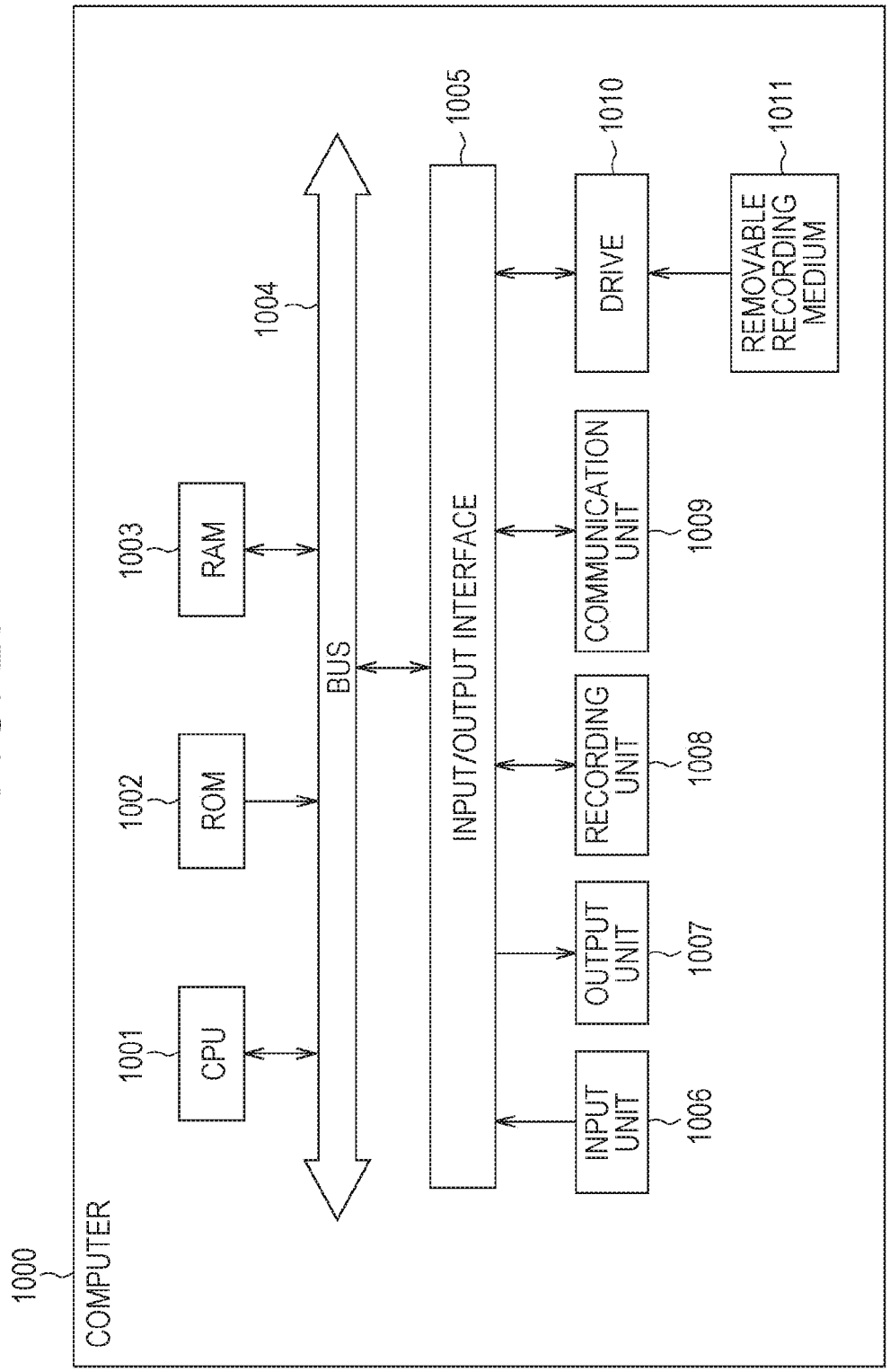
FIG. 27 is a diagram illustrating a configuration example of a computer.

FIG. 27 is a block diagram illustrating a configuration example of hardware of a computer that executes the series of processing described above by a program.

In the computer 1000, a CPU 1001, a read only memory (ROM) 1002, and a random access memory (RAM) 1003 are connected to each other by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, or the like. The communication unit 1009 includes a network interface and the like. The drive 1010 drives a removable recording medium 1011 such as a magnetic disk, an optical disk, a magneto-optical disk, a semiconductor memory, or the like.

In the computer 1000 configured as described above, the CPU 1001 performs the series of processing described above by loading, for example, a program recorded in the recording unit 1008 into the RAM 1003 via the input/output interface 1005 and the bus 1004 and executing the program.

The program executed by the computer 1000 (CPU 1001) can be provided by being recorded on the removable recording medium 1011 as, for example, a package medium and the like. Furthermore, the program can be provided via a wired or wireless transmission medium such as a local area network, the Internet, or digital satellite broadcasting.

In the computer 1000, the program can be installed in the recording unit 1008 via the input/output interface 1005 by mounting the removable recording medium 1011 on the drive 1010. Furthermore, the program can be received by the communication unit 1009 via the wired or wireless transmission medium and be installed in the recording unit 1008. In addition, the program can be installed in the ROM 1002 or the recording unit 1008 in advance.

Note that the program executed by the computer may be a program by which processing is performed in time series according to the order described in the present specification or may be a program by which processing is performed in parallel or at a necessary timing such as a timing when a call is made, or the like.

Furthermore, in the present specification, the system means a set of a plurality of components (apparatuses, modules (parts), or the like), and it does not matter whether or not all the components are in the same housing. Therefore, both of a plurality of apparatuses housed in separate housings and connected to each other via a network and one apparatus in which a plurality of modules is housed in one housing are systems.

Moreover, the embodiment of the present technology is not limited to the embodiment described above, and various modifications can be made without departing from the scope of the present technology.

For example, the present technology can have a configuration of cloud computing in which one function is shared and jointly processed by a plurality of apparatuses via a network.

Furthermore, the respective steps described in the above-mentioned flowcharts can be executed by one apparatus or can be executed in a shared manner by a plurality of apparatuses.

Moreover, in a case where a plurality of processing is included in one step, the plurality of processing included in one step can be executed by one apparatus or can be executed in a shared manner by a plurality of apparatuses.

<Combination Example of Configuration>

The present technology can also adopt the following configuration.

(1)

An information processing apparatus including:

a storage control unit that controls a storage unit to store a combination of a device unique key and an installation key, the device unique key being a key unique to an electronic device, and the installation key being a key for installing a license to the electronic device; and a license management unit that updates information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

(2)

The information processing apparatus according to the above (1), in which the license management unit generates the installation key using device information that is information including the device unique key and generated by the electronic device, and the storage control unit controls the storage unit to store a combination of the device unique key in the device information and the installation key generated by the license management unit.

(3)

The information processing apparatus according to the above (2), in which the device unique key is generated before the device information is generated for the first time by the electronic device.

(4)

The information processing apparatus according to the above (2) or (3), further including a data generation unit that generates license communication information that is information including the installation key and used for installing the license in the electronic device.

(5)

The information processing apparatus according to the above (4), in which the license management unit further generates an installation key management ID having a data length shorter than that of the installation key and unique to the installation key, the storage control unit controls the storage unit to store a combination of the device unique key, the installation key, and the installation key management ID, the license communication information includes the installation key and the installation key management ID, and the installation key information includes at least one of at least a part of the installation key or the installation key management ID.

(6)

The information processing apparatus according to any one of the above (1) to (5), in which the license return information stores a hash value of data in the license return information, and the license management unit calculates a hash value of data in the license return information using the device unique key stored in the storage unit, and updates the information regarding the status of the license in a case where the calculated hash value coincides with the hash value in the license return information and the installation key combined with the device unique key in the storage unit coincides with the installation key corresponding to the installation key information in the license return information.

(7)

The information processing apparatus according to any one of the above (1) to (6), in which the storage control unit controls the storage unit to store a combination of the device unique key, the installation key, and a device unique ID that is an ID unique to the electronic device, the license return information further includes the device unique ID of the electronic device, and the license management unit updates the information regarding the status of the license in a case where a combination of the device unique key corresponding to the license return information, the installation key corresponding to the installation key information in the license return information, and the device unique ID in the license return information coincides with a combination stored in the storage unit.

(8)

The information processing apparatus according to any one of the above (1) to (7), further including a communication control unit that controls reception of the license return information from another information processing apparatus that transmits the license return information stored in a removable medium by the electronic device.

(9)

The information processing apparatus according to any one of the above (1) to (8), in which the license management unit updates the information regarding the status of the license in a case where the license is deactivated in the electronic device and is usable in another electronic device.

(10)

An information processing method including:

controlling, by an information processing apparatus, a storage unit to store a combination of a device unique key and an installation key, the device unique key being a key unique to an electronic device, and the installation key being a key for installing a license to the electronic device; and updating, by the information processing apparatus, information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

(11)

A program for causing a computer to execute processing for:

controlling a storage unit to store a combination of a device unique key and an installation key, the device unique key being a key unique to an electronic device, and the installation key being a key for installing a license to the electronic device; and updating information regarding a status of the license in a case where a combination of the device unique key corresponding to license return information and the installation key corresponding to installation key information in the license return information coincides with a combination stored in the storage unit, the license return information being information including the installation key information corresponding to the installation key and generated by the electronic device.

(12)

An electronic device including:

a key generation unit that generates a device unique key that is a key unique to every device; and a data generation unit that generates license return information, the license return information being information which includes installation key information corresponding to an installation key supplied from a first information processing apparatus in order to install a license and whose security is secured using the device unique key and being information which is used for returning the license to the first information processing apparatus.

(13)

The electronic device according to the above (12), in which the data generation unit further generates device information that is information including the device unique key and used for issuing the license in the first information processing apparatus.

(14)

The electronic device according to the above (13), in which the key generation unit generates the device unique key before the device information is generated for the first time.

(15)

The electronic device according to the above (13) or (14), further including a license management unit that installs the license and deactivates the license returned to the first information processing apparatus, using the installation key included in license communication information, the license communication information being information generated by the first information processing apparatus using the device information.

(16)

The electronic device according to the above (15), in which the license communication information includes the installation key and an installation key management ID having a data length shorter than that of the installation key and unique to the installation key, and the installation key information includes at least one of at least a part of the installation key or the installation key management ID.

(17)

The electronic device according to any one of the above (12) to (16), in which the data generation unit calculates a hash value of data in the license return information using the device unique key, and stores the hash value in the license return information.

(18)

The electronic device according to any one of the above (12) to (17), in which the license return information further includes a device unique ID that is an ID unique to the electronic device.

(19)

The electronic device according to any one of the above (12) to (18), in which the data generation unit stores the license return information in a removable medium, and a second information processing apparatus transmits the license return information stored in the removable medium to the first information processing apparatus.

(20)

The electronic device according to any one of the above (12) to (19), further including a user interface control unit that controls display of a screen used for selecting a function of returning the license, in which the data generation unit generates the license return information used for returning the license of the function selected on the screen.

(21)

An information processing method including:

generating, by an electronic device, a device unique key that is a key unique to the electronic device; and generating, by the electronic device, license return information, the license return information being information which includes installation key information corresponding to an installation key supplied from an information processing apparatus in order to install a license and whose security is secured using the device unique key and being information which is used for returning the license to the information processing apparatus.

(22)

A program for causing a computer of an electronic device to execute processing for:

generating a device unique key that is a key unique to the electronic device; and generating license return information, the license return information being information which includes installation key information corresponding to an installation key supplied from an information processing apparatus in order to install a license and whose security is secured using the device unique key and being information which is used for returning the license to the information processing apparatus.

(23)

An information processing system including:

an electronic device;

a first information processing apparatus; and a second information processing apparatus, in which the electronic device generates a device unique key that is a key unique to the electronic device, and generates license return information, the license return information being information which includes installation key information corresponding to an installation key supplied from the second information processing apparatus in order to install a license and whose security is secured using the device unique key, the first information processing apparatus transmits the license return information to the second information processing apparatus, and the second information processing apparatus updates information regarding a status of the license in a case where a combination of the device unique key corresponding to the license return information and the installation key corresponding to the installation key information in the license return information coincides with a combination stored in a storage unit.

Note that effects described in the present specification are merely examples and are not limited, and other effects may be provided.

REFERENCE SIGNS LIST

10 Information processing system
11 Server
12 Client
13 Network
21 PC
22 Removable medium
23 Electronic device
102 Control unit
105 RTC
151 License management unit
152 Data generation unit
153 UI control unit
154 Communication control unit
155 Storage control unit
202 Function execution unit
203 Control unit
206 RTC
207 Drive
251 License management unit
252 Key generation unit
253 Data generation unit
254 UI control unit
255 Communication control unit
256 Storage control unit

The invention claimed is:

1. A first information processing apparatus, comprising:
a central processing unit (CPU) is configured to:
control reception of device information of a first electronic device, wherein
the device information includes a first device unique key, and
the first device unique key is unique to the first electronic device;
generate a first installation key, wherein the first installation key is for installation of a license to the first electronic device;
control a storage device to store a combination of the first device unique key and the first installation key;
control reception of license return information from a second information processing apparatus, wherein
the received license return information includes installation key information, data, and a first hash value of the data;
determine that a combination of a second device unique key corresponding to the license return information and a second installation key corresponding to the installation key information in the license return information coincides with the stored combination of the first device unique key and the first installation key;
generate a second hash value of the data in the received license return information based on the first device unique key;
determine the generated second hash value of the data coincides with the first hash value of the data;

determine that the received license return information is valid based on the determination that the generated second hash value coincides with the first hash value; and update information of a status of the license based on:
the determination that the received license return information is valid, and
the first installation key that coincides with the second installation key corresponding to the installation key information.

2. The first information processing apparatus according to claim 1, wherein
the CPU is further configured to generate the first installation key based on the first device unique key, and
the first device unique key is generated by the first electronic device.

3. The first information processing apparatus according to claim 2, wherein the first device unique key is generated before the device information is generated for a first time by the first electronic device.

4. The first information processing apparatus according to claim 2, wherein
the CPU is further configured to generate license communication information, and
the license communication information includes the first installation key.

5. The first information processing apparatus according to claim 4, wherein
the CPU is further configured to generate an installation key management identification (ID) having a data length shorter than that of the first installation key,
the installation key management ID is unique to the first installation key,
control the storage device to store a combination of the first device unique key, the first installation key, and the installation key management ID,
the license communication information includes the first installation key and the installation key management ID, and
the installation key information includes at least one of at least a part of the first installation key or the installation key management ID.

6. The first information processing apparatus according to claim 1, wherein the CPU is further configured to:
control the storage device to store a combination of the first device unique key, the first installation key, and a first device unique ID that is an ID unique to the first electronic device, wherein the license return information further includes a second device unique ID of the first electronic device; and
update the information regarding the status of the license based on a combination of the second device unique key corresponding to the license return information, the second installation key corresponding to the installation key information in the license return information, and the second device unique ID in the license return information coincides with the stored combination of the first device unique key, the first installation key, and the first device unique ID.

7. The first information processing apparatus according to claim 1, the license return information is stored in a removable medium by the first electronic device.

8. The first information processing apparatus according to claim 1, wherein the CPU is further configured to update the information regarding the status of the license based on deactivation of the license in the first electronic device and license being usable in a second electronic device different from the first electronic device.

9. An information processing method, comprising:
controlling, by a first information processing apparatus, reception of device information of an electronic device, wherein
the device information includes a first device unique key, and
the first device unique key is unique to the electronic device;
generating, by the first information processing apparatus, a first installation key, wherein the first installation key is for installation of a license to the electronic device;
controlling, by the first information processing apparatus, a storage device to store a combination of the first device unique key and the first installation key;
controlling, by the first information processing apparatus, reception of license return information from a second information processing apparatus, wherein the received license return information includes installation key information, data, and a first hash value of the data;
determining, by the first information processing apparatus, a combination of a second device unique key corresponding to the license return information and a second installation key corresponding to the installation key information in the license return information coincides with the stored combination of the first device unique key and the first installation key;
generating, by the first information processing apparatus, a second hash value of the data in the received license return information based on the first device unique key;
determining, by the first information processing apparatus, the generated second hash value of the data coincides with the first hash value of the data;
determining, by the first information processing apparatus, that the received license return information is valid based on the determination that the generated second hash value coincides with the first hash value; and
updating, by the first information processing apparatus, information of a status of the license based on:
the determination that the received license return information is valid, and
the first installation key that coincides with the second installation key corresponding to the installation key information.

10. A non-transitory computer-readable medium having stored thereon, computer-executable instructions which, when executed by a processor of a first information processing apparatus, cause the processor to execute operations, the operations comprising:
controlling reception of device information of an electronic device, wherein
the device information includes a first device unique key, and
the first device unique key is unique to the electronic device;
generating a first installation key, wherein the first installation key is for installation of a license to the electronic device;
controlling a storage device to store a combination of the first device unique key and the first installation key;
controlling reception of license return information from a second information processing apparatus, wherein the received license return information includes installation key information, data, and a first hash value of the data;

determining a combination of a second device unique key corresponding to the license return information and a second installation key corresponding to the installation key information in the license return information coincides with the stored combination of the first device unique key and the first installation key;

generating a second hash value of the data in the received license return information based on the first device unique key;

determining the generated second hash value of the data coincides with the first hash value of the data;

determining that the received license return information is valid based on the determination that the generated second hash value coincides with the first hash value; and updating information of a status of the license based on:
the determination that the received license return information is valid, and
the first installation key that coincides with the second installation key corresponding to the installation key information.

11. An electronic device, comprising:
a central processing unit (CPU) configured to:
generate a device unique key unique to the electronic device;
control reception of an installation key from a first information processing apparatus, wherein the installation key is for installation of a license;
generate data based on the installation key;
generate a hash value of the data based on the device unique key;
generate license return information that includes the hash value of the data and installation key information corresponding to the received installation key, wherein the generated license return information is for returning the license to the first information processing apparatus; and
control a storage device to store the generated license return information.

12. The electronic device according to claim 11, wherein the CPU is further configured to generate device information that includes the device unique key, and
the generated device information is used by the first information processing apparatus for issuance of the license.

13. The electronic device according to claim 12, wherein the CPU is further configured to generate the device unique key before the device information is generated for a first time.

14. The electronic device according to claim 12, wherein the CPU is further configured to:
control transmission of the device information to the first information processing apparatus;
control reception of license communication information based on the transmission of the device information, wherein the license communication information includes the installation key;
install the license based on the installation key in the license communication information; and
deactivate the license, returned to the first information processing apparatus, based on the installation key in the license communication information, the license communication information is generated by the first information processing apparatus using the device information.

15. The electronic device according to claim 14, wherein
the license communication information includes the installation key and an installation key management ID,
the installation key management ID has a data length shorter than that of the installation key,
the installation key management ID is unique to the installation key, and
the installation key information includes at least one of at least a part of the installation key or the installation key management ID.

16. The electronic device according to claim 11, wherein the license return information further includes a device unique ID that is unique to the electronic device.

17. The electronic device according to claim 11, wherein
the storage device is a removable medium, and
a second information processing apparatus transmits the license return information stored in the removable medium to the first information processing apparatus.

18. The electronic device according to claim 11, wherein the CPU is further configured to:
control a display screen to display information for selection of a function of returning the license; and
generate the license return information for returning the license of the function selected on the display screen.

19. An information processing method, comprising:
generating, by an electronic device, a device unique key unique to the electronic device;
controlling, by the electronic device, reception of an installation key from an information processing apparatus, wherein the installation key is for installation of a license;
generating, by the electronic device, data based on the installation key;
generating, by the electronic device, a hash value of the data based on the device unique key;
generating, by the electronic device, license return information that includes the hash value of the data and installation key information corresponding to the received installation key, wherein the generated license return information is for returning the license to the information processing apparatus; and
controlling, by the electronic device, a storage device to store the generated license return information.

20. A non-transitory computer-readable medium having stored thereon, computer-executable instructions which, when executed by a processor of an electronic device, cause the processor to execute operations, the operations comprising:
generating a device unique key unique to the electronic device;
controlling reception of an installation key from an information processing apparatus, wherein the installation key is for installation of a license;
generating data based on the installation key;
generating a hash value of the data based on the device unique key;
generating license return information that includes the hash value of the data and installation key information corresponding to the received installation key, wherein the generated license return information is for returning the license to the information processing apparatus; and
controlling a storage device to store the generated license return information.

21. An information processing system, comprising:
an electronic device that includes a first central processing unit (CPU);
a first information processing apparatus; and
a second information processing apparatus that includes a second CPU, wherein
the first CPU is configured to:
- generate a first device unique key unique to the electronic device;
- receive a first installation key from the second information processing apparatus for installation of a license to the electronic device;
- generate data based on the first installation key; and
- generate license return information that includes installation key information corresponding to the received first installation key, the data, and a first hash value of the data, the first information processing apparatus is configured to transmit the license return information to the second information processing apparatus, and the second CPU is configured to:
- generate a second installation key for installation of the license to the electronic device;
- control a storage device to store a combination of a second device unique key of the electronic device and the second installation key;
- control reception of the license return information from the first information processing apparatus;
- determine that a combination of the first device unique key corresponding to the received license return information and the first installation key corresponding to the installation key information in the received license return information coincides with the stored combination of the second device unique key and the second installation key;
- generate a second hash value of the data in the received license return information based on the stored second device unique key;
- determine the generated second hash value of the data coincides with the first hash value of the data;
- determine that the received license return information is valid based on the determination that the generated second hash value coincides with the first hash value; and
- update information of a status of the license based on:
  - the determination that the received license return information is valid, and
  - the second installation key that coincides with the first installation key corresponding to the installation key information.

* * * * *